(12) United States Patent
Golitschek Edler von Elbwart et al.

(10) Patent No.: US 10,355,829 B2
(45) Date of Patent: Jul. 16, 2019

(54) CONVEYING NUMBER OF REQUIRED HARQ REPETITIONS FOR COVERAGE ENHANCEMENT

(71) Applicant: Panasonic Intellectual Property Corporation of America, Torrance, CA (US)

(72) Inventors: Alexander Golitschek Edler von Elbwart, Darmstadt (DE); Tetsuya Yamamoto, Kanagawa (JP); Hidetoshi Suzuki, Kanagawa (JP); Chi Gao, Beijing (CN); Sujuan Feng, Frankfurt am Main (DE); Prateek Basu Mallick, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 127 days.

(21) Appl. No.: 15/327,634

(22) PCT Filed: Jul. 29, 2014

(86) PCT No.: PCT/CN2014/083182
§ 371 (c)(1),
(2) Date: Jan. 19, 2017

(87) PCT Pub. No.: WO2016/015213
PCT Pub. Date: Feb. 4, 2016

(65) Prior Publication Data
US 2017/0214495 A1 Jul. 27, 2017

(51) Int. Cl.
*H04L 1/08* (2006.01)
*H04L 1/18* (2006.01)
(Continued)

(52) U.S. Cl.
CPC .......... *H04L 1/1861* (2013.01); *H04L 1/1671* (2013.01); *H04L 1/189* (2013.01);
(Continued)

(58) Field of Classification Search
None
See application file for complete search history.

(56) References Cited

U.S. PATENT DOCUMENTS 8,738,983 B2    5/2014  Gerstenberger et al.
2010/0272048 A1*  10/2010  Pan ...................... H04L 1/1635
                                                                        370/329
(Continued)

FOREIGN PATENT DOCUMENTS

CN    101971546 A    2/2011
CN    103916225 A    7/2014
(Continued)

OTHER PUBLICATIONS

Alcatel-Lucent, Alcatel-Lucent Shanghai Bell, "Coverage enhancement for RACH," R12-140726, 3GPP TSG-RAN WG2 Meeting #85, Agenda item: 7.9.2, Prague, Czech Republic, Feb. 10-14, 2014, 6 pages.
(Continued)

*Primary Examiner* — Duc T Duong
(74) *Attorney, Agent, or Firm* — Seed IP Law Group LLP

(57) ABSTRACT

The invention relates to transmission and reception of data in a wireless communication system. In particular, the predetermined number of repetitions of the same data portion is transmitted over the wireless interface. The receiving device receives the repetitions, attempts their decoding and checks whether the decoding was successful. If the decoding was successful after the predetermined number of repetitions or less, a positive acknowledgement is generated. In addition, a feedback including a bundle size information is
(Continued)

generated and transmitted. The bundle size information includes a number of repetitions, smaller or equal to the predetermined number, after which the decoding was successful. The feedback is transmitted to the data transmitting device which may adapt the predetermined number of repetitions accordingly. The invention enables efficient control of the number of repetitions applied which is particularly advantageous for coverage enhancement purposes.

16 Claims, 8 Drawing Sheets

(51) Int. Cl.
  *H04W 72/04* (2009.01)
  *H04L 1/16* (2006.01)
  *H04L 5/00* (2006.01)

(52) U.S. Cl.
  CPC .......... *H04L 1/1864* (2013.01); *H04L 5/0055* (2013.01); *H04W 72/048* (2013.01); *H04W 72/0413* (2013.01)

(56) References Cited

U.S. PATENT DOCUMENTS

| | | | |
|---|---|---|---|
| 2011/0004797 A1 | 1/2011 | Gerstenberger et al. | |
| 2011/0044409 A1 | 2/2011 | Yoshimoto et al. | |
| 2012/0192026 A1* | 7/2012 | Chen, Jr. ............... | H04L 1/0066 714/751 |
| 2012/0320880 A1* | 12/2012 | Han ........................ | H04L 5/001 370/335 |
| 2014/0040694 A1* | 2/2014 | Verma ................... | H04L 1/1812 714/748 |
| 2014/0064098 A1 | 3/2014 | Choi et al. | |
| 2015/0029890 A1* | 1/2015 | Siomina ................ | H04L 1/1854 370/252 |
| 2015/0036476 A1* | 2/2015 | Vos ....................... | H04W 72/1278 370/216 |
| 2015/0039958 A1* | 2/2015 | Vos ........................ | H04L 1/1819 714/748 |
| 2015/0222407 A1* | 8/2015 | Nammi ................ | H04B 7/0413 370/336 |
| 2015/0229444 A1* | 8/2015 | Webb ...................... | H04L 1/08 370/329 |
| 2016/0020873 A1* | 1/2016 | Park ...................... | H04L 1/1854 370/336 |

FOREIGN PATENT DOCUMENTS

| | | |
|---|---|---|
| EP | 3 139 529 A1 | 3/2017 |
| JP | 2007525043 A | 8/2007 |
| JP | 2011527531 A | 10/2011 |
| JP | 2011530950 A | 12/2011 |
| JP | 2012503398 A | 2/2012 |
| WO | 2014/075272 A1 | 5/2014 |
| WO | 2014/110781 A1 | 7/2014 |

OTHER PUBLICATIONS

Extended European Search Report, dated Feb. 27, 2018, for related European Patent Application No. 14898589.8-1219 / 3175570, 10 pages.
3GPP TR 25.913 V9.0.0, "$3^{rd}$ Generation Partnership Project; Technical Specification Group Radio Access Network; Requirements for Evolved UTRA (E-UTRA) and Evolved UTRAN (E-UTRAN) (Release 9)," Dec. 2009, 18 pages.
3GPP TR 36.824 V11.0.0, "$3^{rd}$ Generation Partnership Project; Technical Specification Group Radio Access Network; Evolved Universal Terrestrial Radio Access (E-UTRA); LTE coverage enhancements (Release 11)," Jun. 2012, 18 pages.
3GPP TR 36.888 V12.0.0, "$3^{rd}$ Generation Partnership Project; Technical Specification Group Radio Access Network; Study on provision of low-cost Machine-Type Communications (MTC) User Equipments (UEs) based on LTE (Release 12)," Jun. 2013, 55 pages.
3GPP TS 36.211 V12.1.0, "$3^{rd}$ Generation Partnership Project; Technical Specification Group Radio Access Network; Evolved Universal Terrestrial Radio Access (E-UTRA); Physical channels and modulation (Release 12)," Mar. 2014, 120 pages.
3GPP TS 36.211 V12.2.0, "$3^{rd}$ Generation Partnership Project; Technical Specification Group Radio Access Network; Evolved Universal Terrestrial Radio Access (E-UTRA); Physical channels and modulation (Release 12)," Jun. 2014, 121 pages.
3GPP TS 36.212 V12.0.0, $3^{rd}$ Generation Partnership Project; Technical Specification Group Radio Access Network; Evolved Universal Terrestrial Radio Access (E-UTRA); Multiplexing and channel coding (Release 12), Dec. 2013, 88 pages.
3GPP TS 36.213 V12.1.0, "$3^{rd}$ Generation Partnership Project; Technical Specification Group Radio Access Network; Evolved Universal Terrestrial Radio Access (E-UTRA); Physical procedures (Release 12)," Mar. 2014, 186 pages.
3GPP TS 36.331 V12.1.0, "$3^{rd}$ Generation Partnership Project; Technical Specification Group Radio Access Network; Evolved Universal Terrestrial Radio Access (E-UTRA); Radio Resource Control (RRC); Protocol specification (Release 12)," Mar. 2014, 356 pages.
International Search Report dated Mar. 27, 2015, for corresponding CN Application No. PCT/CN2014/083182, 2 pages.

* cited by examiner

CONVEYING NUMBER OF REQUIRED HARQ REPETITIONS FOR COVERAGE ENHANCEMENT

The present invention relates to transmitting data and feedback concerning reception of the data in a wireless communication system.

TECHNOLOGICAL BACKGROUND

Third generation (3G) mobile cellular systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The downlink supports data modulation schemes QPSK, 16QAM, and 64QAM and the uplink supports QPSK, 16QAM, and at least for some devices also 64QAM, for physical data channel transmissions. The term "downlink" denotes direction from the network to the terminal. The term "uplink" denotes direction from the terminal to the network.

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive. In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE. The work item (WI) specification on Long-Term Evolution (LTE) called Evolved UMTS Terrestrial Radio Access (UTRA) and UMTS Terrestrial Radio Access Network (UTRAN) is finalized as Release 8 (Rel. 8 LTE). The LTE system represents efficient packet-based radio access and radio access networks that provide full IP-based functionalities with low latency and low cost. The detailed system requirements are given in 3GPP specification TR 25.913, "Requirements for Evolved UTRA and Evolved UTRAN", ver.9.0.0, freely available at www.3gpp.org.

In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

The overall architecture is shown in FIG. 1. The E-UTRAN comprises eNBs, providing the E-UTRA user plane (PDCP/RLC/MAC/PHY) and control plane (RRC) protocol terminations towards the UE. The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNBs. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GVV). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

FIG. 2 illustrates structure of a component carrier in LTE Release 8 and later releases. The downlink component carrier of the 3GPP LTE Release 8 is sub-divided in the time-frequency domain in so-called sub-frames each of which is divided into two downlink slots, one of which is shown in FIG. 2 as corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier.

In particular, the smallest unit of resources that can be assigned by a scheduler is a resource block also called physical resource block (PRB). A PRB is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $1 \cdot N_{symb}^{DL}$ modulation symbols of the sub-frame in the time domain. $N_{symb}^{DL}$ may be either 6 or 7 resulting in either 12 or 14 OFDM symbols in total. Consequently, a physical resource block consists of $N_{symb}^{DL} \times N_{sc}^{RB}$ resource elements corresponding to one slot in the time domain and 180 kHz in the frequency domain (further details on the downlink resource grid can be found, for example, in Section 6.2 of the 3GPP TS 36.211, "Evolved universal terrestrial radio access (E-UTRA); physical channels and modulations (Release 12)", version 12.1.0, March 2014, freely available at www.3gpp.org, which is incorporated herein by reference and denoted as "TS 36.211" in the following). While it can happen that some resource elements within a resource block or resource block pair are not used even though it has been scheduled, for simplicity of the used terminology still the whole resource block or resource block pair is assigned. Examples for resource elements that are actually not assigned by a scheduler include reference signals, broadcast signals, synchronization signals, and resource elements used for various control signal or channel transmissions.

The number of physical resource blocks $N_{RB}^{DL}$ in downlink depends on the downlink transmission bandwidth configured in the cell and is at present defined in LTE as being from the interval of 6 to 110 (P)RBs. It is common practice in LTE to denote the bandwidth either in units of Hz (e.g. 10 MHz) or in units of resource blocks, e.g. for the downlink case the cell bandwidth can equivalently expressed as e.g. 10 MHz or $N_{RB}^{DL}$=50RB.

Generally, it may be assumed that a resource block designates the smallest resource unit on an air interface of a mobile communication that can be assigned by a scheduler for transmitting data. The dimensions of a resource block may be any combination of time (e.g. time slot, sub-frame, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

In 3GPP LTE Release 8 the downlink control signalling is basically carried by the following three physical channels:

Physical control format indicator channel (PCFICH) for indicating the number of OFDM symbols used for control signalling in a sub-frame (i.e. the size of the control channel region);

Physical hybrid ARQ indicator channel (PHICH) for carrying the downlink ACK/NACK associated with uplink data transmission; and Physical downlink control channel (PDCCH) for carrying downlink scheduling assignments and uplink scheduling assignments.

The PCFICH is sent from a known position within the control signalling region of a downlink sub-frame using a known pre-defined modulation and coding scheme. The user equipment decodes the PCFICH in order to obtain information about a size of the control signalling region in a sub-frame, for instance, the number of OFDM symbols. If the user equipment (UE) is unable to decode the PCFICH or if it obtains an erroneous PCFICH value, it will not be able to correctly decode the L1/L2 control signalling (PDCCH) comprised in the control signalling region, which may result in losing all resource assignments contained therein.

The PDCCH carries downlink control information, such as, for instance, scheduling grants for allocating resources for downlink or uplink data transmission. The PDCCH for the user equipment is transmitted on the first of either one, two or three OFDM symbols according to PCFICH within a sub-frame.

Physical downlink shared channel (PDSCH) is used to transport user data. PDSCH is mapped to the remaining OFDM symbols within one sub-frame after PDCCH. The PDSCH resources allocated for one UE are in the units of resource block for each sub-frame.

Physical uplink shared channel (PUSCH) carries user data. Physical Uplink Control Channel (PUCCH) carries signalling in the uplink direction such as scheduling requests, HARQ positive and negative acknowledgements in response to data packets on PDSCH, and channel state information (CSI).

User data (IP packets) to be transmitted over the communication network may be generated by the user application. They may include speech, video, text, or any other media possibly compressed and encapsulated into other protocols before forming the IP packets. The IP packets are in EUTRAN further processed on the PDCP layer resulting in addition of a PDCP header. The PDCP packets formed in this manner are further segmented and/or reassembled (reassembling being shown in the figure) into RLC packets to which an RLC header is added. One or more RLC packets are then encapsulated into a MAC packet including also a MAC header and padding, if necessary.

The MAC packet is also called "transport block". Thus, a transport block is from the point of view of the physical layer a packet of user data entering the physical layer. There are predefined transport block sizes (TBS) which may be used in LTE. The transport block is then within one transmission time interval (TTI) mapped onto the subframes on the physical layer (PHY). Details of the mapping of data starting with transport blocks up to the interleaving is shown in FIGS. 5.2.2-1 and 5.3.2-1 and described in the related description of the 3GPP TS 36.212, v.12.0.0, "Evolved universal terrestrial radio access (E-UTRA); Multiplexing and channel coding", 2013, denoted in the following as TS 36.212 available freely at www.3gpp.org and incorporated herein by reference, for the uplink and downlink transmission of user data respectively. Furthermore, the physical channel mapping is described in detail in FIGS. 6.3-1 and FIGS. 5.3-1 for downlink and uplink, respectively, and the related description in the 3GPP TS 36.211.

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user. For the downlink data transmissions in LTE, the eNodeB typically selects the modulation scheme and code rate (MCS) depending on a prediction of the downlink channel conditions. An important input to this selection process is the Channel State Information (CSI) feedback (mentioned above) transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential. In order to select appropriate transmission parameter for a PDSCH transmission, the serving eNB relies on channel state information (CSI) reporting from the UE, which in LTE consists of the following:

Rank Indicator (RI)
Precoding Matrix Indicator (PMI)
Channel Quality Indicator (CQI)

The CQI is used as input for the link adaptation algorithm in terms of MCS selection. The exact format of the CSI message depends on the reporting mode. The CQI may include separately coded wideband CQI and one or more subband CQIs, which are differentially coded with respect to the wideband CQI. The reporting mode is configurable by means of RRC signaling as described in 3GPP TS 36.331, v.12.1.0, 2014, "Radio Resource Control: Protocol specification", freely available under www.3gpp.org. Reporting modes currently supported by LTE are defined in 3GPP TS 36.213, v.12.1.0, 2014, "Physical Layer Procedures" freely available under www.3gpp.org, and in particular in Section 6.2, e.g. information element "CQIreportConfig".

The uplink and downlink resource grants (grants enabling the UE to transmit data in downlink and uplink, respectively) are transmitted from the eNodeB to the UE in a downlink control information (DCI) via PDCCH. The downlink control information may be transmitted in different formats, depending on the signaling information necessary. In general, the DCI may include: a resource block assignment (RBA) and modulation and coding scheme (MCS).

It may include further information, such as HARQ related information like redundancy version (RV), HARQ process number, or new data indicator (NDI); MIMO related information such as pre-coding; power control related information, etc.

As described above, in order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can basically change from subframe to subframe. It should be noted that user allocation might also be performed on a TTI (Transmission Time Interval) basis, where the TTI length can be in general a multiple of the subframes or correspond to a subframe. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

In 3GPP LTE, assignments for uplink data transmissions, also referred to as uplink scheduling grants or uplink resource assignments, are also transmitted on the PDCCH. Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity. Then, the users (UEs) perform blind decoding by demasking the identities transmitted in the search space (i.e. in the resources configured as search space in which the respective terminals have to monitor the control information whether there is data for them).

Resource allocation information, indicating the resources (Resource Blocks, RBs) on which a user is allocated. Note, that the number of RBs on which a user is allocated can thus be dynamic. In particular, the number of the resource blocks (frequency domain) is carried by the resource allocation information. The position in the time domain (subframe) is given by the subframe in which the PDCCH is received and a predefined rule (the resources are allocated fixed number of subframes after the PDCCH subframe)

Carrier indicator, which is used if a control channel transmitted on a first carrier assigns resources that concern a second carrier, i.e. resources on a second carrier or resources related to a second carrier if carrier aggregation is applied.

Modulation and coding scheme that determines the employed modulation scheme and coding rate (length of the transport block to be coded).

HARQ information, such as a new data indicator (NDI) and/or a redundancy version (RV) that is particularly useful in retransmissions of data packets or parts thereof. In particular, new data indicator indicated whether the allocation is for an initial transmission of data or for a retransmission of data. Redundancy version indicates the coding applied to the retransmitted data (in LTE incremental redundancy combining is supported, meaning that each retransmission may include the data of the first transmission differently coded, i.e. may include parity bits which together with the already received transmission/retransmission(s) finally enable decoding).

Power control commands to adjust the transmit power of the assigned uplink data or control information transmission.

Reference signal information such as the applied cyclic shift and/or orthogonal cover code index, which are to be employed for transmission or reception of reference signals related to the assignment.

Uplink or downlink assignment index that is used to identify an order of assignments, which is particularly useful in TDD systems.

Hopping information, e.g. an indication whether and how to apply resource hopping in order to increase the frequency diversity.

CSI request, which is used to trigger the transmission of channel state information in an assigned resource.

Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in its fields. The different DCI formats that are currently defined for LTE are as follows and described in detail in 3GPP TS 36.212, v.12.0.0 "Multiplexing and channel coding", section 5.3.3.1 (available at http://www.3gpp.org and incorporated herein by reference). For instance, DCI Format 0 is used for the transmission of resource grants for the PUSCH, using single-antenna port transmissions in uplink transmission mode 1 or 2.

In order for the UE to identify whether it has received a PDCCH transmission correctly, error detection is provided by means of a 16-bit CRC appended to each PDCCH (i.e. DCI).

Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below. The entire payload is used to calculate the CRC parity bits. The parity bits are computed and attached. In the case where UE transmit antenna selection is not configured or applicable, after attachment, the CRC parity bits are scrambled with the corresponding RNTI.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity. The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

The physical downlink control channel (PDCCH) carries e.g. scheduling grants for allocating resources for downlink or uplink data transmission. Multiple PDCCHs can be transmitted in a subframe. The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as PDCCH region or control channel region. The remaining $N_{symb}^{PDSCH} = 2 \cdot N_{symb}^{DL} - N_{symb}^{PDCCH}$ OFDM symbols in the time domain on the $N_{RB}^{DL} \times N_{sc}^{RB}$ subcarriers in the frequency domain is referred to as the PDSCH region or shared channel region. On a transport channel level, the information transmitted via the PDCCH is also referred to as L1/L2 control signaling (for details on L1/L2 control signaling see above).

As a further enhancement of the LTE, 3GPP has started an activity on Network Improvements for Machine Type Communication (MTC). The MTC terminals or MTC devices are characterized in that they are usually not operated by a human being. Rather, the communication peer is another machine such as a so called MTC server or another MTC terminal(s). As the MTC devices can be also mobile terminals as specified by the 3GPP, a more general notification like "UE" is also used throughout this description, so that the MTC device, terminal or UE are used interchangeable.

The MTC has some particular features which differ from the usual human-to-human communication. 3GPP tries to identify these particular features in order to optimize the network operations. These specifics are called "MTC features". For instance, an MTC device typically sends or receives smaller amounts of data. Another feature of the MTC devices and 3GPP core network (CN) shall be the ability to allow an external server (MTC server) to trigger the MTC device to initiate a communication with the MTC server. This is enabled by a so-called "device triggering". The Device Triggering is initiated by the MTC server and can be performed by different means.

In addition to the cell coverage footprint defined by the LTE for the purpose of machine type communications, the need for further coverage enhancement is acknowledged. The particular need for coverage enhancement for MTC is given, for instance, by the deployment scenario typical for MTC terminals. The MTC terminals may likely be deployed deep inside buildings which may cause significantly greater penetration losses on the radio interface than the expected scenarios for the usual LTE devices.

Some concepts of the LTE coverage enhancements considered by 3GPP can be found in the 3GPP TR 36.824 v11.0.0, "E-UTRA LTE coverage enhancement", June 2012. In particular, TTI-bundling fort the uplink transmission is discussed.

In 3GPP TR 36.888 v12.0.0, "Study on provision of low-cost Machine-Type-Communications (MTC) User Equipments (UEs) based on LTE", June 2013 and especially in Section 9.5.6, the concept of repetitions for PDSCH is briefly analyzed, wherein the number of repetitions assumed ranges between 100 and 200. The number of repetitions for PUCCH assumed in Section 9.5.5 ranges from 50 to 100. For the purpose of improving the coverage, as the main technique a so-called "repetition" has been discussed within the standardization. The repetition means that the same data is transmitted spread within multiple subframes, i.e. in a plurality of subframes a copy of the same data is conveyed in order to provide some redundancy and increased diversity in the temporal domain. The repetition technique can be applied to any or every channel; it may be configured and reconfigured in order to improve the coverage in a specific scenario.

However, the time domain repetition may also cause spectral efficiency degradation since it requires more physical resources for the transmission of the repetitions per one user equipment (UE). This may be critical for the downlink transmission. Thus, it is desirable to employ the repetition mode efficiently.

SUMMARY OF THE INVENTION

The data receiving devices in the LTE provide feedback information including channel quality indication (CQI).

However, it is observed that in the case of coverage enhancement employing repetitions, the CQI would mostly indicate as a value "out of range" since the coverage enhancement is meant to be employed in case the normal coverage is not available. This has the effect that the base station is unable to estimate accurately the length of the bundle to be configured for the data receiving device. The correct configuration of the bundle size is important for an efficient resource utilization. If the bundle is longer than necessary, expensive redundancy is introduced which may result in the reduced capacity of the system. If the bundle is shorter than necessary, then it will not be sufficient to convey the data, which, on the other hand, triggers additional retransmissions after receiving the negative acknowledgement. This may lead to a loss of capacity and also to extensive delays.

In view of the above observations, the aim of the present disclosure is to increase the efficiency of the coverage enhancement employing repetitions in the time domain.

This is achieved by the features of the independent claims.

Advantageous embodiments are subject matter of the dependent claims.

The particular approach of the present disclosure is to provide the data transmitting device with a feedback concerning the appropriate bundle size.

According to an aspect of the invention, an apparatus is provided for receiving data in a wireless communications system, the apparatus comprising: a receiving unit for receiving up to a predetermined number N of transmissions of a data portion, coded in the respective predetermined number N of subframes; a feedback control unit for judging whether or not the data portion was decoded successfully and for generating a positive or a negative reception acknowledgement in accordance with the result of the judging, and for determining a number of transmissions Ne after which the decoding of the data portion was successful; a transmitting unit configured to transmit the reception acknowledgement and to transmit a bundle length information corresponding to the determined number Ne of transmissions or a function of said determined number Ne of transmissions.

According to another aspect of the invention an apparatus is provided for transmitting data in a wireless communications system, the apparatus comprising: a transmitting unit for transmitting a predetermined number N of transmissions of a data portion, coded in the respective predetermined number N of subframes; a feedback receiving unit for receiving a reception acknowledgement and for receiving a bundle length information from a data receiving apparatus, the bundle length information corresponding to a number of transmissions or a function of said number of transmissions after which the decoding of the data portion at the receiving apparatus was successful; a transmission control unit for setting the predetermined number N in accordance with the received bundle length information.

According to another aspect of the invention, a method is provided for receiving data in a wireless communications system, the method comprising: receiving up to a predetermined number N of transmissions of a data portion, coded in the respective predetermined number N of subframes; judging whether or not the data portion was decoded successfully and for generating a positive or a negative reception acknowledgement in accordance with the result of the judging, and for determining a number of transmissions Ne after which the decoding of the data portion was successful; transmitting the reception acknowledgement and to transmit a bundle length information corresponding to the determined number Ne of transmissions or a function of said determined number Ne of transmissions.

According to another aspect of the invention, a method is provided for transmitting data in a wireless communications system, the method comprising: transmitting a predetermined number N of transmissions of a data portion, coded in the respective predetermined number N of subframes; receiving a reception acknowledgement and for receiving a bundle length information from a data receiving apparatus, the bundle length information corresponding to a number of transmissions or a function of said number of transmissions after which the decoding of the data portion at the receiving apparatus was successful; and setting the predetermined number N in accordance with the received bundle length information.

In accordance with another embodiment, a computer program product comprising a computer-readable medium having a computer-readable program code embodied thereon is provided, the program code being adapted to carry out the present invention.

According to an embodiment, the above apparatus is embodies on an integrated circuit.

The above objectives and other objectives and features of the present invention will become more apparent from the following description and preferred embodiments, given in conjunction with the accompanying drawings in which.

DETAILED DESCRIPTION

Figure 1:
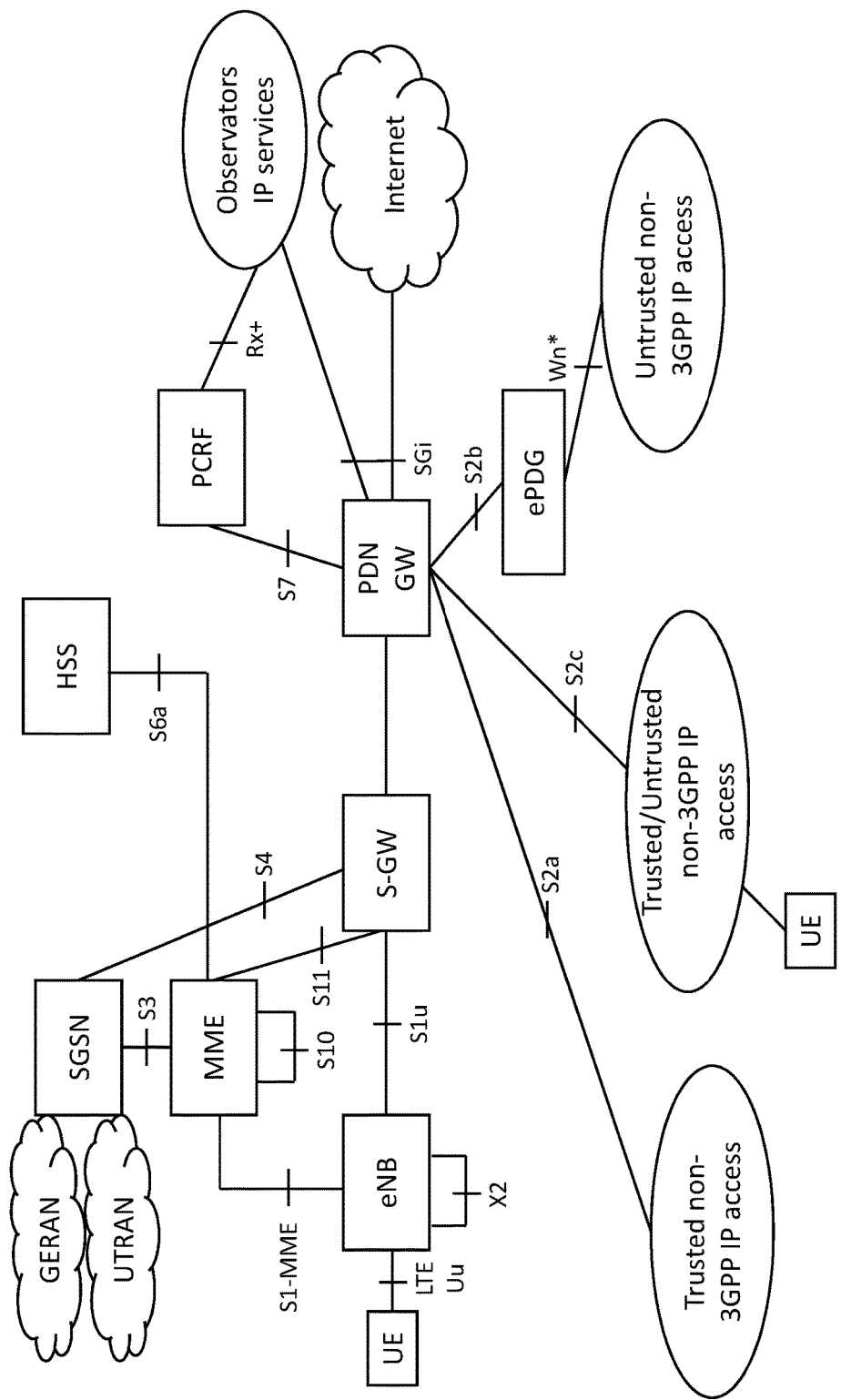
FIG. 1 is a block diagram illustrating an example of an overall LTE architecture.
Figure 2:
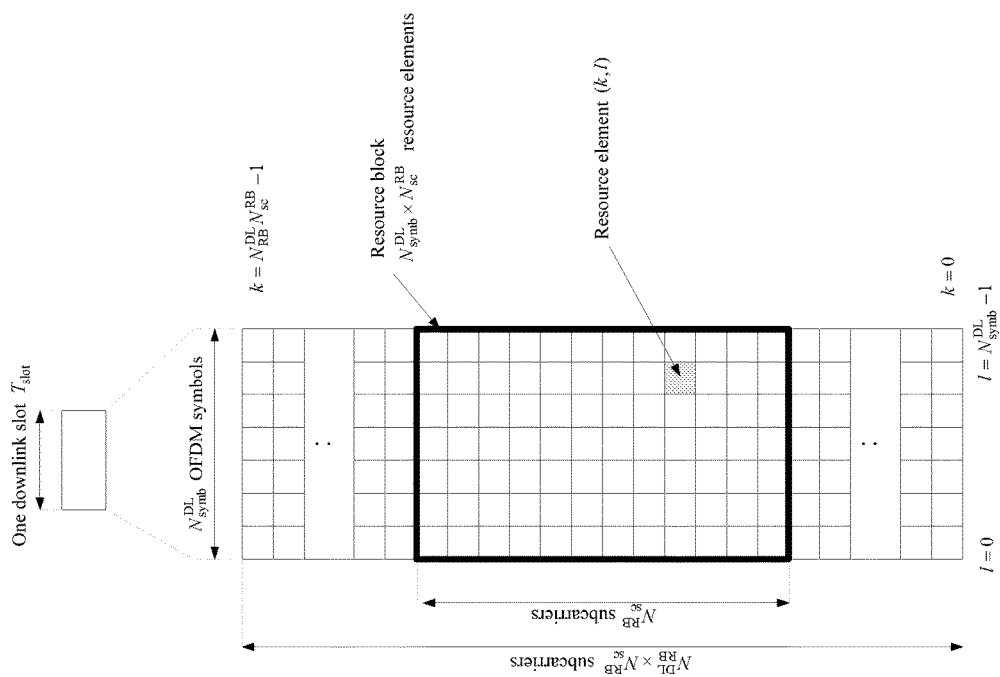
FIG. 2 is a block diagram illustrating an example of an LTE access network architecture.

An embodiment of the present invention concerns transmission and reception of data in a repeated manner, the repetitions being spread over a plurality of subframes in a communication system. In particular, the communication system includes a data transmitting device and a data receiving device communicating together over of wireless interface. The data transmitting device and the data receiving device may be respectively one of a network node such as a base station or a relay as well as a wireless device which is not a network node such as a user equipment (terminal), which may be a mobile phone, a smartphone, a tablet, a notebook or another computer. The term "network node" in this context is to be understood as any node connected to a network, for instance, a cellular network. It is noted that the term "cellular network" or "cell" refer to any arrangement of a cell including macro cells, micro cells, pico cells, femto cells or any other concepts. The network node may thus be a base station such as ENodeB or a relay provided as a part of the network.

In the following, an embodiment is described based on the LTE specification. However, the present invention is in no way limited to the LTE. The concepts and examples described therein are applicable to any wireless system in which data repetition is applied. In the case of the LTE system, in an advantageous embodiment, the data transmitting device is the eNB whereas the data receiving device is a user equipment. Accordingly, the eNB controls the repetition applied by both the eNB and the UE.

The term data receiving device refers to a device which receives data from a data transmitting device and provides the data transmitting device with feedback concerning the successful reception and decoding of the data received. The data transmitting device in a wireless system in the downlink direction may be for instance a base station (eNB in LTE) or a relay node. The data receiving device in the wireless system in the downlink direction may be for instance a user equipment. In the uplink direction in the wireless system, the data transmitting device is a user terminal or a user equipment (UE).

However, the present invention is not limited to communication between a base station and the terminal but may also be applied in direct communication between two terminals, of which one is the data transmitting device and another one is the data are receiving device.

As described above, when applying the repetition for the purpose of enhancing the coverage additional resources are necessary for the repeated data. Accordingly, the number of repetitions has to be selected carefully in order to efficiently use the system resources. In particular, in the downlink direction the repetitions may cause a bottleneck. The uplink resources should not likely represent a bottleneck since it is assumed that not many terminals in the coverage enhancement mode supporting repetition would be scheduled within the same subframe. In the coverage enhancement mode employing repetitions, the same transport block (the same data portion) is used to form one or more code blocks. The code block(s) pertaining to the same transport block are transmitted in a plurality of subframes (bundle) without intermittent positive or negative acknowledgement fed back by the terminal to the eNB. Even though the code blocks are generally not identical, they represent the same transport block (the same portion of data), and are therefore considered to facilitate a transport block repetition. Such a bundle may preferably be transmitted in subsequent subframes in order to keep the overall time required for transmission of the whole bundle as small as possible, resulting in a minimum data transmission delay. This approach is furthermore beneficial if the channel is not or only barely fluctuating and well known by the transmitter to exploit the channel capacity well. On the other hand, if the channel is not well known and/or fluctuating over time, it is preferable to exploit time diversity, for which it is beneficial if a bundle spans an extended time period. In such a case, it is therefore preferable if a bundle is transmitted with one or more gaps of at least one subframe each. Those gap subframe of a first bundle could be used for transmissions to another data receiving device so that the corresponding channel capacity is not lost to the system.

In order to generate and transmit repetitions, the data transmitting device determines the data portion to be transmitted. This may be for instance a transport block as defined in the LTE. Then in accordance with the number of repetitions (bundle length), the data portion is encoded into N code blocks. The data portion may be encoded in an at least partly different manner in order to increase the diversity resulting in N code blocks of which not all are identical, or which are mutually different in the extreme case that the encoding is completely different. Alternatively, and still within the present embodiment, the data portion may be encoded and the same encoded version may be then transmitted within different subframes, resulting in N identical code blocks. Different individual coding of their respective copies of the data portion provides higher diversity. For instance, the data portion may be encoded using a different redundancy version which enables chase combining or incremental redundancy at the receiver, similarly to the techniques applied for the hybrid automatic repeat request (HARQ). Encoding by forward error correction (FEC) and rate matching for generating redundancy versions are exemplarily outlined in 3GPP TS 36.212 v12.0.0, "E-UTRA Multiplexing and Channel Coding", in particular Section 5.

After generating the coded or repeated code blocks, they are mapped onto the system resources. In particular, in the present embodiment, each code block is mapped into an individual subframe. The set of all transmissions of a (the same) data portion is referred to in the following as "bundle". The size of the bundle, i.e. the number of code blocks (transmissions of the same data portion) is advantageously signaled to the data receiving device (e.g. UE) by the data transmitting device (e.g. eNB) within a corresponding DCI indication or by a semi-static configuration. The DCI itself and/or the signaling may be transmitted in multiple subframes in order to increase the DCI coverage.

The data transmitting device transmits a predetermined number, N, of transmissions (code blocks) of the same data portion coded in N subframes. Here, N is an integer equal to or greater than 1, and will be referred to in the following also as "transmission bundle". In other words, N denotes the number of transmissions (repetitions of same data portion but possibly differently coded) effectuated by the data transmitting device.

In one exemplary implementation of the present invention, the predetermined number N may be configured by the data transmitting device and notified from the data transmitting device to the data receiving device, for instance, by means of semi-static signaling by higher layers such as RRC or MAC, or, alternatively at the physical layer, e.g. as a part of the DCI. In particular, the predetermined number N may be configured within an RRC message such as "RADIO BEARER SETUP" or "RADIO BEARER RECONFIGURATION". Alternatively, the predetermined number N may be conveyed to the data receiving device within an MAC information element. In a specific case, N is equal to the bundle size, and can therefore be conveyed by means of a DCI as outlined above. However, the present invention is not limited by the way in which the number N of transmissions of the data portion is notified to the data receiving device. In particular, the number N of transmissions may also be determined without transmitting it, implicitly in the same way at the transmitter and the receiver. This may be performed for instance based on the feedback information including the bundle length information transmitted (i.e. fed back) from the data receiving device to the data transmitting device as will be described below in more detail.

The data receiving device checks whether it is capable of decoding successfully the data portion and generates a positive or a negative acknowledgement. The judging of whether or not the data portion was decoded successfully can be performed by checking an error detection code such as parity code, in particular cyclic redundancy check (CRC) code. The present invention is not limited by the way in which the successful decoding is checked. For instance, the detection may also be performed by comparing, after decoding of two transmissions of the same data portion, the two data portions decoded, and concluding that the decoding was not successful if they differ from each other and concluding that the decoding of wars successful if they do not differ. Moreover, the checking of successful decoding may be performed after combining the bits decoded from different transmissions of the same data portion which is particularly beneficial if the different transmissions were coded using a different coding scheme or redundancy version.

The evaluation as to whether or not the decoding was successful is advantageously performed after reception of each transmission of the same data portion (each repetition). This approach provides the advantage that as soon as the data portion is decoded successfully, the reception and/or decoding of the following transmissions of the same data portion up to N repetitions can be ignored by the data receiving device. This is beneficial for saving power of the data receiving device which is particularly relevant for the machine-type communication terminals. On the other hand, a lower complexity implementation may be adopted, in which the intermediate evaluation of successful decoding is performed after receiving a selected number of q transmissions. This approach can be further expanded by evaluating a successful decoding multiple times for different values of q, where each q is an integer equal to or greater than one and smaller than N ($1<=q<N$). The applicable value(s) of q may be configurable and given to the data receiving device by the data transmitting device. For instance, the evaluation may be performed after q=10 repetitions out of N=16. Alternatively, the evaluation may be performed after q=10 repetitions and then after q=13 repetitions. However, these are only examples and q may be selected in any way and also configurable/reconfigurable by the network. Each value of q may be an integer number that can be expressed by powers of 2 and/or powers of 5 to align with the existing HARQ and radio frame structure, which is based on up to 8 ($=2^3$) HARQ processes and 10 ($=2^1*5^1$) subframes. Performing multiple evaluations of successful decoding may further be advantageously regularized by evaluating after every r-th transmission, where $1<=r<N$. r can be preferably expressed by powers of 2 and/or powers of 5 to align with the existing HARQ and radio frame structure, which is based on up to 8 ($=2^3$) HARQ processes and 10 ($=2^1*5^1$) subframes. This includes the specific case that r is equal to 1, resulting in an evaluation after each transmission. In addition to evaluating successful decoding after receiving less than N transmissions (potentially multiple times, as outlined previously), the evaluation of successful decoding should be performed after receiving all N transmissions of the same data portion especially if previous evaluation(s) of successful decoding for the same data portion have resulted in a non-successful decoding result. Alternatively, the evaluation of successful decoding may be performed after receiving all N transmissions of the same data portion.

As soon as it is determined that the data portion was decoded successfully, a positive acknowledgement is generated, or, in other words, the status of successful decoding is temporarily stored to be transmitted as feedback to the data transmitting device. In this case, the data receiver device may additionally skip further decoding attempts for the same transport block (including the attempt after the reception of all N transmissions). A negative acknowledgement is generated when the data portion cannot be successfully decoded after reception of all N transmissions (repetitions) of the data portion.

In one implementation of this embodiment, the data receiving device (UE) provides the base station with a feedback including positive or negative acknowledgement after the reception of the last subframe in the bundle irrespectively of the amount r of repetitions after which the successful decoding is judged. However, the present invention is not limited to such implementation and in general, the positive acknowledgement may be provided to the data transmitting device as soon as the data receiving device was able to successfully decode the data portion. For instance, the data receiving device may provide the data transmitting device with the positive acknowledgement after the first r (r is equal to or greater than one and smaller than N) repetitions after which the decoding was successful.

In accordance with this embodiment of the present invention, the data receiving device provides the base station with a feedback concerning the bundle length for repetitions in the time domain, i.e. the number of transmissions of a data portion. The aim of the feedback is to provide the transmitting device with information enabling it to select the appropriate number of repetitions for future transmissions. In particular, the bundle length information should indicate the bundle length sufficient for successfully decoding the data portion of the data receiving device. This may be for instance a number of subframes, in which the same corresponding number of code blocks were transmitted and which resulted to successful decoding in the past or a function of such number. Here, the past may be one or more past receptions of the respective one or more bundles with the respective data portion(s). In case that the data receiving device judges the successful decoding for several bundle lengths, such as for different values of r, the smallest such number is used to generate the corresponding feedback, such as the smallest such value of r.

As described above, in the LTE downlink, the eNB currently does not have any quality feedback in case of coverage enhancement by employing repetitions, since the provided CQI would likely indicate that the UE is out of range, i.e. out of the normal coverage of the eNB. In accordance with the present embodiment, thus a feedback concerning an appropriate number of repetitions of the same data portion (bundle length) is determined and fed back to the network (to the eNB).

In particular, the number of transmissions Nd of the data portion is determined after which the decoding was successful. This may be the smallest number of repetitions sufficient for decoding the data portion successfully. Determining the smallest number with a full granularity is possible only if the judgement on whether or not the decoding was successful is performed after each transmission (r=1). However, other implementations are also possible and may constitute a better tradeoff between the complexity and the efficiency of the feedback. For instance, it is possible to perform decoding after reception of each two (r=2) or each four repetitions (r=4) of the data portion, in which case the exact smallest number of repetitions sufficient for decoding the data portion successfully would not be necessarily determined as Nd. For example, if a decoding check is performed after 4 transmissions resulting in incorrect decoding, and another decoding check is performed after 8 transmissions resulting in correct decoding, the smallest number of repetitions sufficient for decoding the data portion successfully could be one of the values {5, 6, 7, 8} but the data receiving device cannot reasonably determine which of those is accurate. Rather, Nd could only be determined with higher granularity (lower resolution) than one repetition; for instance, for r=4 Nd could only take values 4, 8, 12, etc. In the above example, therefore the data receiving device would determine Nd=8 as it is the smallest number of repetitions for which the data receiving device was able to determine a successful decoding of the data portion. In general, the number of transmissions Nd of a data portion after which the data portion was successfully decoded is an integer greater than 0, and can preferably take the value of N and at least another value.

In one exemplary implementation the number Nd is smaller than or equal to N, wherein N is the predetermined number of repetitions of the data portion transmitted by the data transmitting device. In other words, the value Nd is only determined with respect to the most recently transmitted transmission bundle and can therefore not exceed the value of N. This has the advantage that Nd is strictly bounded and therefore can only take a finite number of values up to N.

In another implementation, the value Nd is determined with respect to the accumulated bundle size of all transmission bundles pertaining to the same data portion. This has the advantage that the value Nd is self-sufficient as it expresses the overall number of repetitions of the data portion. However, on the other hand, this may theoretically result in a possibly infinite value of Nd, which is not practical. Therefore, in such an implementation, there is preferably a predetermined value Ndmax that is assumed if more than Ndmax repetitions of the data portion are determined to be necessary for successful decoding by the data receiving device. Thus, Ndmax is the maximum number of repetitions counted over all transmission bundles conveying transmissions (code blocks) of the same data portion. If the length N of a transmission bundle is not changed between different bundles of the same data portion, preferably the value Ndmax is an integer multiple of N.

In the above described implementation the number Nd may be larger than N, i.e. in case of a negative acknowledgement after first N repetitions, a cumulative number of transmissions of the same data portion may be determined. For instance, if N=16 and after reception of all 16 repetitions, the data receiving device was still not capable of decoding the data portion correctly, so a negative acknowledgement is issued and the data transmitting device repeats the 16 transmissions of the same data portions again resulting in a total of 32 repetitions of the same data portion. If within this retransmission the data portion was successfully decoded after the 10th transmission, the parameter Nd could be determined to have the value of N+10, i.e. the value of 26. It might even be possible that the value of N for the first bundle is different from the value N of the second transmission bundle pertaining to the same data portion. For instance, if the transmission bundle size is N1 and the data portion could not be successfully decoded after N1 repetitions, the transmission bundle size may be reconfigured to a new value N2 for the retransmission of the transmission bundle. If the data portion conveys in the N1 and N2 repetitions still could not be decoded, another transmission bundle could be transmitted. Assuming exemplarily that the data portion was decoded after 4 repetitions of the third transmission bundle, the value signaled as Nd would be N1+N2+4. As described above, Nd may have a resolution coarser (coarser resolution corresponds to less values for the same range) than 1, corresponding to r>1.

After the determination of the number of transmissions Nd, the data receiving device transmits feedback to the data transmitting device. In particular, the feedback includes information concerning the number of transmissions Ne appropriate in view of the determined (observed) number of transmissions Nd. Such bundle length information Ne may directly be the number of transmissions Nd determined, after which the decoding of the data portion was successful. However, the bundle length information may also be a bundle length Ne which is a function of the determined number of transmissions Nd, such as an average or median over currently determined Nd and the previously determined values of Nd or any other function thereof. In general, the estimated number of transmissions Ne sufficient for successful decoding is provided from the data receiving device to the data transmitting device as bundle length information.

It is noted that not each determined Nd must also be transmitted as a feedback. In general, the frequency of transmitting the bundle length information may differ from the frequency of the determination of the sufficient number of transmissions Nd. In one exemplary implementation of the present embodiment, the feedback including the bundle length information is transmitted together with the positive or negative acknowledgement after each bundle transmission, i.e. after transmission of all the N repetitions of the data portion bundle. In another implementation of the embodiment, the bundle length information is transmitted with a lower frequency than the positive or negative acknowledgement. In this case, the averaging over a plurality of determined values of Nd would be particularly beneficial. However, instead of the averaging another function may be used. For instance, the most frequent Nd among the recent bundle transmissions or a median or the last determined Nd may be transmitted as the estimated number of transmissions Ne. The most frequent Nd among the recent bundle transmissions is preferential because it would represent the single most likely transmission condition. The last determined Nd is preferential because it represents the most recent transmission condition most accurately. Alternatively, the maximum determined Nd may be transmitted as the estimated number of transmissions Ne, as it gives a kind of worst-case transmission condition information. Alternatively, the minimum determined Nd may be transmitted as the estimated number of transmissions Ne, as it gives a kind of best-case transmission condition information.

In summary, the bundle length information Ne may consist or include of the Nd determined or a function of Nd. The bundle length information may be further coded for instance by using a variable length code and/or by differential coding (coding difference with respect to previously transmitted value). Similar to Nd, the possible values of Ne do not have to be a contiguous range of integer numbers. Instead, the numbers that can be signaled by Ne are discrete and finite. The specific constraints outlined before for the possible values of Nd can be applied to Ne mutatis mutandis.

The data transmitting device receives the feedback information including the bundle length information.

The data transmitting device, such as eNodeB in the LTE, or generally a base station or a network node, may then use the bundle length information Ne fed back to control the transmission bundle size N applied, i.e. to adapt the transmission bundle size N for future downlink transmissions, for instance, in an outer loop. In particular, the data transmitting device may generate control information indicating the new transmission bundle length N and transmit it to the data receiving device and apply the signaled transmission bundle length when transmitting further data portions. Such control information may be conveyed within a higher-layer message. The data receiving device may then transmit to the data transmitting device a confirmation of the newly set transmission bundle length from the data receiving device. As described above, such signaling may be performed at radio bearer establishment and/or at reconfiguration by means of radio resource control protocol. However, the present invention is not limited to such implementation and the (re-)configuration of the transmission bundle size N may be performed at any layer, for instance by means of MAC signaling or physical layer signaling. For example, the transmission bundle length N may be (re-)configured dynamically within DCI, i.e. together with a transmission resource assignment. In such case, preferably, no confirmation of the (re-)configuration from the data receiving to the data transmitting device is transmitted. An advantage of transmitting the (re-)configuration with the resource assignment is that usually, an acknowledgement is fed back by the receiving unit to indicate a successful or unsuccessful reception of a data portion. The presence of such an acknowledgement is therefore an indication that the DCI has been detected correctly, and therefore implicitly that the (re-)configuration of the transmission bundle length N is detected correctly as well. The lack of such an acknowledgement indicates on the other hand that the DCI and therefore also the (re-)configuration of the transmission bundle length N has not been detected correctly.

In order to provide the feedback concerning the sufficient bundle length Ne from the data receiving device to the data transmitting device in the bundle length information dynamically, the bundle length information may be transmitted together with the positive (ACK) or negative (HACK) reception acknowledgement of the data portion transmission. For instance, the reception acknowledgement and the bundle length information may be coded separately and transmitted together within one control message. Alternatively, the feedback information may be generated by jointly coding the reception acknowledgement (positive and/or negative) and the bundle length information. For instance, a code word set may be provided for jointly coding the reception acknowledgement and the bundle length information, including a plurality of code words of which each indicates a positive acknowledgement and a particular bundle length. The codeword set advantageously further includes a code word indicating a negative acknowledgement.

In order to increase the chance of the data transmitting device to receive the feedback information and to decode it successfully, the reception acknowledgement transmission and/or the transmission of the bundle length information may be also spread over multiple (uplink) subframes. Accordingly, the feedback information is mapped onto the wireless system resources in the time domain (subframes) by spreading the feedback information to a plurality M of subframes, which are located at least a predetermined number k of subframes after the last subframe of the predetermined number N of transmissions of the same data portion. Here, M is the number of subframes in which the feedback information concerning one downlink bundle is transmitted. Number k is a number of subframes between the last subframe of the downlink bundle and the first subframe of the uplink bundle carrying the feedback.

The above implementation corresponds to a synchronous transmission of the feedback information with respect to the bundle transmission. It has the advantage of a fixed (pre-defined) allocation of the resources for the feedback information depending only on the position of the bundle in the time domain. However, the present invention is not limited to synchronous feedback signaling and in general the feedback information may be transmitted in any resources such as previously allocated resources or as within a random access in which collisions are possible.

One of the possibilities of performing the joint coding of the reception acknowledgement and the bundle length is to spread the feedback information over the M subframes in accordance with a spreading rule which is determined in accordance with the bundle length information.

For instance, the spreading rules may correspond to a spreading code indicating which out of a plurality of uplink resources is used in a subframe for the transmission of the feedback information. For example, in LTE PUCCH, a PUCCH resource index is used to determine a cyclic shift index, and possibly a further orthogonal sequence index. In addition, a frequency domain index corresponding to a resource block is used to characterize a PUCCH transmission. These or combinations of these can be used to determine the uplink resource that is used in a subframe for the transmission of the feedback information. As such, the spreading rule in a general form would be represented by a sequence or pattern, exemplarily generated by means of one or more pseudo-noise or random number generators, that determines the uplink resource hopping pattern. For example, if the uplink resource hopping pattern includes a frequency component, the result is a frequency hopping of the feedback information across or within subframes. Such frequency component may be, for instance, a resource block or a component carrier. If the uplink resource hopping pattern includes a time domain component, the hopping is characterized by different subframes, in which the feedback is signaled. If the uplink resource hopping pattern includes a cyclic shift component, then a different cyclic shift sequence is used in different subframes of the feedback information transmission.

As an example for such a hopping sequence, if there is a total of 16 uplink resources available in each subframe, then the spreading code would indicate for each subframe which one out of the 16 uplink resources is utilized for transmission of the feedback in that subframe. The exact sequence could exemplarily be obtained by a binary pseudo-noise generator where 4 bits are taken to form pseudo-random numbers from 0 to 15.

Alternatively, the spreading rules may correspond to respective spreading codes such as orthogonal spreading codes used in spread spectrum systems for separating different users. Spreading codes are typically pseudo random sequences which are orthogonal with respect to each other meaning that there are cross correlation at zero mutual shift is zero. In one exemplary implementation of this embodiment, among a predetermined number d of codes, some codes specify the positive acknowledgement and different respective bundle length information values.

As a specific example for application to LTE acknowledgement transmissions over PUCCH, the spreading code is applied only to the transmission conveying the acknowledgement message as such, but not to corresponding reference symbols that are usable for coherent demodulation of the acknowledgement message.

For improved cross-correlation properties e.g. to avoid collisions between two different spreading codes, many different sequence or code generation approaches are prevalent in literature, such as Gold sequence, Zadoff-Chu sequence, Kasami codes, Walsh codes, Lehmer random number generator, to name but a few.

The number d of the spreading codes can be smaller than the number N of downlink bundle transmissions (or, in general, number of data transmissions from the data transmitting device to the data receiving device). This means that not all possible values 1 to N of the estimated sufficient bundle length Ne may be signaled unambiguously. Rather, only a subset of values of Ne, in particular no more than d values of Ne, may be conveyed. This signaling scheme is particularly advantageous if fewer than N checks for successful decoding are performed, i.e. if a check is not done after each repetition. In particular, it is advantageous to select d being equal to or larger than integer of N/r.

Moreover, since the number of feedback repetitions M may be rather high for the MTC coverage enhancement scenarios (N=100-200 as typically assumed for PDSCH currently, M=50-100 as typically assumed for PDCCH currently), d<M codes may be combined or concatenated to spread the acknowledgement. For instance, a sequence of spreading codes, each code with length d, d<M (preferably M being an integer multiple of d) may indicate the bundle length information value. This approach provides the advantage of keeping the set of codes small even for large numbers of M, as the auto-correlation or cross-correlation property (especially the orthogonality) for a shorter code is more easily maintained than for a longer code especially if the channel is fluctuating in time. It is noted that the present invention is not limited to usage of orthogonal codes and that, alternatively, for spreading of the feedback (bundle length information), also quasi-orthogonal codes may be used such as Gold sequences or any other sequences. In general, the spreading codes do not have to be orthogonal. However, orthogonality maximizes the distance between the codes and thus, minimizes the error probability for the decision between the spreading codes at the receiver. Even for the use of non-orthogonal codes, a short length may be preferable to keep the correlation between codes small for fluctuating channels.

If the feedback information repetition factor M is smaller than the maximum number of data portion repetitions N, the spreading code contains some ambiguity concerning the sufficient bundle length Ne signaled within the feedback information. This is caused by the fact that instead of N possible values for the bundle length, only M values of the bundle length Ne may be signaled. Here, it is assumed that for repetition factor M there are only d=M (preferably orthogonal) spreading codes each of length d=M available. In other words, a plurality of values of Ne shall result in the same spreading code with an index c among d spreading code indices 1 to d (or 0 to d−1) to be applied. Here it is assumed that each spreading code is assigned an index c for identification among other codes.

In particular, the spreading code index c can be determined, by continuous range ambiguity as follows:

$$c = \left\lfloor \frac{(N_e - 1) \cdot M}{N} \right\rfloor \text{ or } c = \left\lceil \frac{N_e \cdot M}{N} \right\rceil,$$

wherein, Ne is the sufficient bundle length determined with the full granularity as a value between one and N, M is the repetition factor for the feedback transmission and in this example also the number of spreading codes available, and N is the number of repetitions in the downlink (which may be counted as the length of a single bundle, or as a cumulative number including possibly multiple bundles pertaining to the same data portion, as outlined previously). The operation $\lfloor \cdot \rfloor$ denotes the largest integer value that is smaller or equal to the argument of the expression, while the operation $\lceil \cdot \rceil$ denotes the smallest integer value that is larger or equal to the argument of the expression. It is noted that in general only a subset of available spreading codes d=M may be used for signaling the bundle length information. When assuming number S<=d of spreading codes to be used, the particular spreading code c for signaling a value Ne of the bundle length information is selected as:

$$c = \left\lfloor \frac{N_e \cdot S}{N} \right\rfloor.$$

In general, the number S of spreading codes to be used may be smaller than or equal to the available number of spreading codes d. Alternatively, the spreading code index c may be determined by modulo ambiguity as follows:

$c = (N_e \bmod S)$ wherein the spreading code index c is one of the spreading code indices 1 to S.

In another alternative, the relation between the spreading code index c and Ne can be determined irregularly, which is most easily expressed by a look-up table like the following:

| Ne | Spreading Code index c |
|---|---|
| First value or range of values | 1 |
| Second value or range of values | 2 |
| Third value or range of values | 3 |
| ... | ... |
| S-th value or range of values | S |

Those skilled in the art will appreciate that above exemplary relations for c can be easily modified to account for different numbering/indexing notations, i.e. by adding or subtracting the value 1 to account for e.g. the spreading code index ranging from 1 to S or from 0 to S−1.

In one implementation, the number of spreading codes S to be used is equal to the number of spreading codes available d, resulting in all available spreading codes being used. This provides the advantage of using shorter spreading codes and reducing thus the complexity and/or memory requirements for storing and/or generating the spreading codes.

In another implementation, the number of spreading codes S to be used is smaller than the number of spreading codes d available but equal to the feedback repetition factor M. This provides the advantage of using only a selected subset of the available codes, which may be a subset of codes having particularly advantageous features such as low cross-correlation between the mutually shifted different codes.

In still another implementation, the number of spreading codes S to be used is smaller than the number of spreading codes d available and greater than the feedback repetition factor M.

As described above, the spreading code in this example is selected in accordance with the bundle size to be provided within the feedback information. The spreading code is then used to spread the acknowledgement (positive or negative) to the number M of subframes. Thus, the length of the spreading code here is also equal to M. The acknowledgement to be signaled may be either a positive acknowledgement or a negative acknowledgement. It may be thus signaled by using one bit which is then spread by the spreading code with the length of M over the M subframes in the time domain. The spreading of the acknowledgement increases the probability of correct decoding of the acknowledgement. Moreover, the spreading code selection enables coding of the bundle length information.

In another implementation, also already briefly discussed above for the case of d<N, the length L of the spreading codes S to be used is smaller than the feedback repetition factor M, in which case it is advantageous if the length of the spreading codes is a divisor or the feedback repetition factor and the spreading is applied blockwise for L feedback subframes as a consequence. Such an implementation is particularly advantageous if the feedback repetition factor is large with respect to a coherence time of the channel, because the auto-correlation or cross-correlation properties between the spreading codes are generally only maintained if the channel characteristics are very coherent over the length of the spreading code. However, in order to achieve a sufficient coverage, the feedback repetition may easily span several 10s of milliseconds, which for a mobile communication system is generally not considered as providing sufficient coherence to maintain the low auto-correlation or cross-correlation of the spreading sequences, particularly in the case of orthogonality. Instead, it is advantageous to have a relatively short length L of a spreading code, which usually is then an upper limit to the number of used spreading codes S. The value of L may be determined implicitly from the number of used spreading codes S and the feedback repetition factor M, or it may be configured explicitly by a control message such as conveyed by MAC control elements or RRC messages.

In order to avoid misinterpretation between positive and negative acknowledgement (ACK-NACK errors), it is beneficial to design the joint codewords (including the spreading code) such that the distance between the negative acknowledgement and any positive acknowledgement is as large as possible. The distance may be measured as a Hamming distance or an Euclidean distance. Hamming distance measured between two binary codewords is a number of bit positions in which the two codewords differ from each other. Euclidean distance is the distance between two modulation constellation points representing two respective codewords in the complex signal plane. By increasing the distance between two codewords, the probability of an error resulting in decoding of the first codeword as the second codeword or vice versa is reduced.

The increasing of the minimum distance between the negative acknowledgement and any positive acknowledgement (i.e. the positive acknowledgement spread by any of the spreading sequences used to indicate the bundle length information) can be achieved, for instance, by employing fewer spreading codes than d.

In particular, the feedback information can be coded by selecting a spreading code with index c (i.e. spreading_code (c)) out of a set of spreading codes, in which there are S spreading codes, S being an integer larger than one and smaller than the number d of available (orthogonal) spreading sequences of a given length L<=M. Out of the S spreading codes, S−1 codes indicate positive acknowledgement and the respective S−1 values for coding of the bundle length information. Moreover, the spreading code indicating the negative acknowledgement has a Hamming or Euclidean distance to any of the S−1 spreading codes indicating the positive acknowledgement larger than the Hemming or Euclidean distance among those S−1 spreading codes indicating the positive acknowledgement. The S possible spreading codes applied to the acknowledgement can be seen as S different codewords of a code jointly coding the acknowledgement (ACK/NACK) and the bundle length information.

Figure 3A:
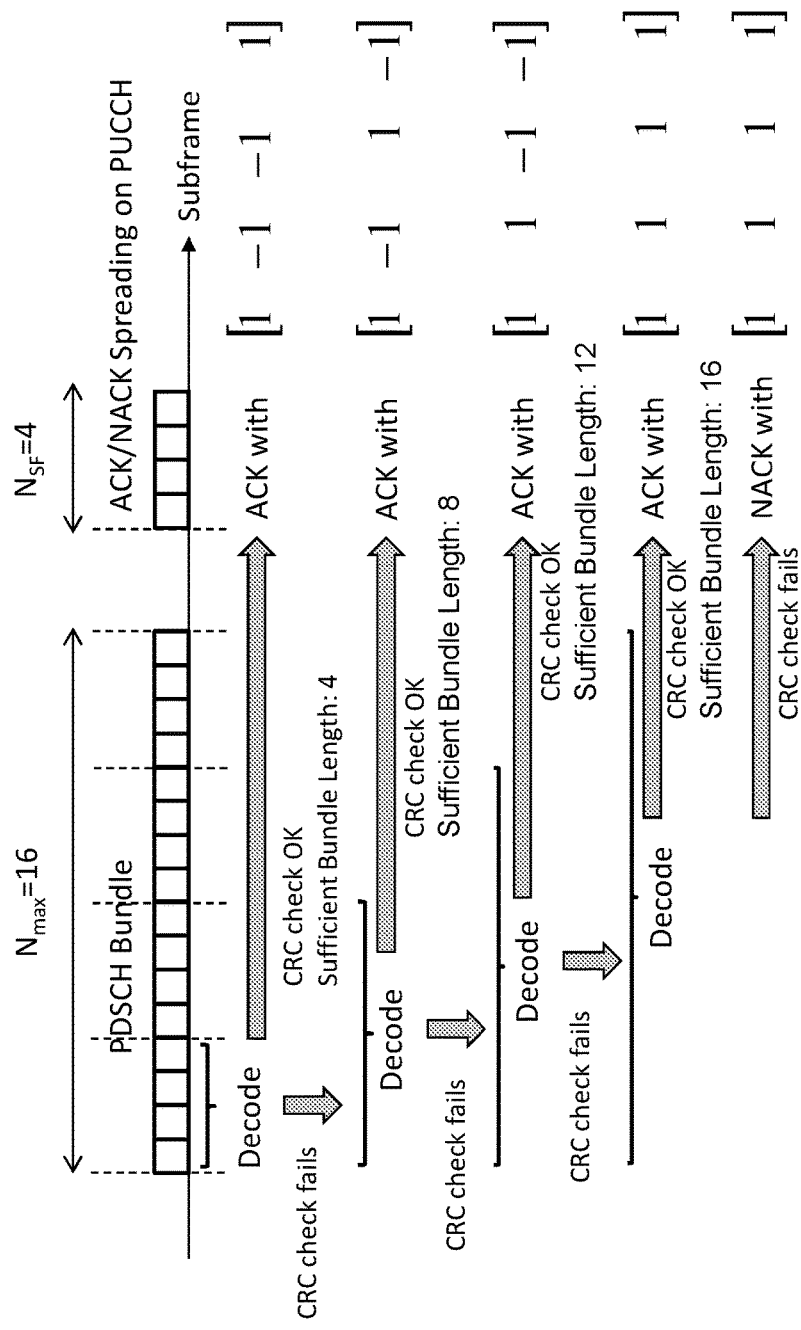
FIG. 3A is a schematic drawing illustrating transmission of data and feedback using repetitions and direct spreading of ACK/NACK.

FIG. 3A illustrates an example of enhanced coverage using repetition as described above. In this example, the eNodeB indicates to a terminal that the bundle size is 16 subframes, i.e. the downlink transmission of a data portion will be spread into 16 subframes (N=16). The terminal is thus configured to expect receipt of 16 times the same data portion. In this example the repetitions are transmitted in consecutive subframes of the PDSCH. However, the present invention is not limited to spreading the repetitions into the consecutive frames. Rather, the repetitions may be distributed in time into subframes in such a manner that between the number of subframes starting with the first transmission and ending with the N-th transmission of the same data portion is larger than N.

The top part of FIG. 3 shows the PDSCH bundle transmitted by the eNodeB. Below the PDSCH bundle, various scenarios of decoding at the terminal are exemplified. In particular, the terminal may receive the first four transmissions of the sent data portion and determine that after reception of the four repetitions the decoding was successful, corresponding to a positive check of the cyclic redundancy check code. In such a case (illustrated by an arrow to the right) a positive acknowledgement (ACK) is generated and transmitted back to the eNB. The positive acknowledgement is spread with the sequence [1 −1 −1 1] which corresponds to bundle length information indicating that the terminal successfully decoded the data portion after four transmissions (in other words, after a bundle of size 4). It is noted that the present example of FIG. 3 may be implemented in two ways:
 1. The decoding is attempted after receiving each four consecutive transmissions of the same data portion (r=4).
 2. The decoding is attempted after receipt of each one transmission of the same data portion.

In this example since the spreading sequence has the length of four (corresponding to the feedback bundle size L=M=4), there may be at most four different spreading sequences of the length 4 orthogonal to each other. Therefore, the first option above would be beneficial, i.e. the decoding is attempted at most four times, i.e. after reception of four, eight, twelve, and sixteen transmissions of the same data portion. Accordingly, the bundle length information only takes four values indicating four, eight, twelve or sixteen subframes, respectively. in the case where the decoding of the first four transmissions of the same data portion is not successful, i.e. the CRC check fails (illustrated in the figure by an arrow to the bottom), the terminal attempts decoding after reception of a further four transmissions of the same data portions, i.e. after receiving eight repetitions. In the case where after reception of the eight repetitions the decoding is successful (CRC check is OK) a positive acknowledgement is generated and spread with a spreading sequence [1 −1 1 −1] which indicates that the sufficient (estimated) bundle length Ne (in this case Ne=Nd) has a value of 8. If the terminal was unable to successfully decode the data portion after eight repetitions, the next attempt to decode takes place after receiving another four repetitions, i.e. after receiving twelve transmissions of the same data portion. If the decoding after the twelve transmissions is successful, a positive acknowledgement is generated and transmitted, spread with a spreading sequence [1 1 −1 −1] which indicates the bundle length Ne of 12.

If the decoding after reception of twelve transmissions of the same data portion still fails, the decoding is attempted after reception of all sixteen transmissions of the same data portion. If the decoding is then successful, a positive acknowledgement is generated and spread with a spreading sequence [1 1 1 1]. If, on the other hand, after all sixteen repetitions, the decoding still fails, a negative acknowledgement is transmitted, spread with the same spreading sequence [1 1 1 1]. The positive and the negative acknowledgement may be indicated by one bit which may be, for instance, 1 and −1, respectively, or vice versa. Accordingly, the jointly coded codeword for the positive acknowledgement and Ne=16 is [1 1 1 1] whereas the codeword for the negative acknowledgement is [−1 −1 −1 −1]. This has the benefit that the signal used for NACK with spreading looks identical to the signal used for NACK without spreading, and is furthermore the inverse of the ACK signal without spreading. This can result in a more simplified implementation of the embodiment especially for cases where the feedback with spreading is employed alongside feedback without spreading in a cell served by the data transmitting device. Alternatively, the employed spreading code for a failed decoding after all sixteen repetitions is identical to the spreading sequence used for the smallest Ne, i.e. [1 −1 −1 1] in this example. The positive and the negative acknowledgement may be indicated by one bit which may be, for instance, 1 and −1, respectively, or vice versa. Accordingly, the jointly coded codeword for the positive acknowledgement and Ne=4 is [1 −1 −1 1] whereas the codeword for the negative acknowledgement is [−1 1 1 −1]. This has the benefit that the distance between NACK and ACK with the minimum Ne is maximized, resulting in a small error probability.

As described above, the example of FIG. 3 may be modified so that S<d. For instance, S=3 which enables signaling of 3 different values for Ne. These may be, for instance, 5, 10, and 16. However these values are only exemplary and any other assignment is within the scope of this embodiment. For instance, it may be beneficial to provide a finer resolution for the values around N. This may be achieved by distributing the 3 Ne values e.g. as 6, 12, 16 or in another way with smaller distance between the values closer to N.

It should be noted that in general, the number of repetitions after which the data receiving unit attempts to decode the data portion does not need to be identical to the values available for Ne. For example, the data receiving unit may choose the number of received repetitions in accordance with the processing capabilities, i.e. taking the hardware/software implementation into account. On the other hand, the system may define or configure which values of Ne are most interesting for the feedback perspective. In such a case, if the data receiving unit determines a successful decoding of the data portion after the reception of a first value of repetitions, the indicated Ne value should correspond to the smallest defined Ne value that is larger than said first value of repetitions. For example, if the 3 different values 5, 10, and 16 are defined for Ne, the data receiving unit should use the following relation to determine which Ne value is given as a feedback:

| Nd: Number of received repetitions for successful decoding of the data portion | Ne value for feedback |
| --- | --- |
| 1-5 | 5 |
| 6-10 | 10 |
| 11-16 | 16 |

The three values Ne may be then coded by respective three different spreading codes.

In the general case of using non-orthogonal spreading codes, an example can be to use the binary representation of 0-15 as the corresponding spreading code. So in case that N=16 and r=1, the following mapping between the spreading code index c and the spreading code could be obtained:

| c | Spreading Code |
| --- | --- |
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |
| 10 | 1001 |
| 11 | 1010 |
| 12 | 1011 |
| 13 | 1100 |
| 14 | 1101 |
| 15 | 1110 |
| 16 | 1111 |

In case that the spreading code is used as an XOR function to the ACK/NACK signal, it is not useful to employ a spreading code and its inverse, e.g. 0000 and 1111 since an ACK spread by 0000 would look the same as a NACK spread by 1111. Therefore if any spreading code used as an XOR function for NACK, its inverse should not be used for any ACK indication. A simple solution in the above table is to not allow the use of spreading code 0000.

Another property that can be seen from the exemplary table is that the difference between e.g. c=2 and c=10 is just the spreading operation of a single subframe. If for example Nd=Ne=c, this implies that even relative small-scale errors (e.g. as here in just a single subframe) may result in a large Ne value error at the data transmitting device. To increase the reliability, the number of used spreading codes should be further reduced and the relation between c and the spreading code should be chosen to guarantee e.g. a minimum Hamming distance of 1 for adjacent values of Ne. The following table gives an example using the modulo ambiguity determination mentioned above:

| Spreading code index c c = Ne mod 8 | Spreading Code |
| --- | --- |
| 0 | 1111 |
| 1 | 1110 |
| 2 | 1010 |
| 3 | 1011 |
| 4 | 0011 |
| 5 | 0111 |
| 6 | 0101 |
| 7 | 1101 |

Here, any two spreading codes for adjacent values Ne and Ne+1 have a Hamming distance of 1, and the Hamming distance between spreading codes for any Ne and Ne+2 is 2.

Therefore the most likely errors have only an Ne error of 1 as a consequence. In addition, the Hamming distance between any spreading code for ACK and the spreading code for NACK (provided that this is chosen from these spreading codes) is 2 as well, meaning that an ACK-NACK error is not the most likely error case.

A different exemplary relation for the continuous range ambiguity is given in the following table:

| Spreading code index c $c = \left\lfloor \frac{(N_e - 1) \cdot 4}{16} \right\rfloor$ | Spreading Code |
|---|---|
| 0 (Ne = 1 ... 4) | 1001 |
| 1 (Ne = 5 ... 8) | 1100 |
| 2 (Ne = 9 ... 12) | 1010 |
| 3 (Ne = 13 ... 16) | 1111 |

Here, the spreading codes have been chosen according to the Walsh-Hadamard matrix (changing from the 1/−1 to the equivalent I/O notation). As known from Walsh-Hadamard matrix theory, the Hamming distance between any two codes of length $2^k$ is $2^{k-1}$, i.e. for a length 4 code the Hamming distance is 2, keeping all error cases equally or even less likely than in an example where 8 spreading codes could be used with some Hamming distances of 1, at the expense of a reduced Ne granularity.

In order to keep the spreading sequences orthogonal, any well known orthogonal pseudo random sequences may be applied. For instance, Walsh-Hadamard code or discrete Fourier transformation (DFT) based complex spreading code may be employed. The Walsh-Hadamard code can be used in cases in which the length of orthogonal code is a power of 2, such as 4, 8 or 16 and so on. The following is an example of a Walsh-Hadamard matrix consisting of rows which represent four different spreading sequences (here using the notation of 1 and −1, those skilled in the art will appreciate that alternative representations using the notation of 1 and 0 are equivalent):

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Other lengths such as 5, 6, 7, 9 and so on may be achieved by applying the DFT based complex spreading code. In the following, an example of a DFT based complex spreading code formed by rows of the matrix are shown:

$$\begin{bmatrix} 1 & 1 & 1 & 1 & 1 \\ 1 & e^{j2\pi/5} & e^{j4\pi/5} & e^{j6\pi/5} & e^{j8\pi/5} \\ 1 & e^{j8\pi/5} & e^{j6\pi/5} & e^{j4\pi/5} & e^{j2\pi/5} \\ 1 & e^{j4\pi/5} & e^{j8\pi/5} & e^{j2\pi/5} & e^{j6\pi/5} \\ 1 & e^{j6\pi/5} & e^{j2\pi/5} & e^{j8\pi/5} & e^{j4\pi/5} \end{bmatrix}$$

Alternatively, Zadoff-Chu (ZC) sequences may be used for spreading. Zadoff-Chu sequences are complex spreading codes which have zero correlation of its cyclical shifts. If a terminal transmits with the same Zadoff-Chu cyclic shift in different subframes, the transmissions are orthogonal even if some subframes overlap. If a terminal transmits with a different Zadoff-Chu cyclic shift in the same subframes, no inter-code interference is introduced. Another advantage of the Zadoff-Chu sequences is that they allow for arbitrary start of reception acknowledgement transmission, i.e. the transmission of the feedback information may be un-slotted. The Zadoff-Chu sequences are also employed in the random access procedure in the LTE. The corresponding part of the specification may be found in 3GPP TS 36.211, v12.2.0., "Physical channels and modulation", Section 5.5.1.

$$\begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix}$$

In the above example, the number of transmissions Nd after which the decoding was successful is determined. The corresponding information, the bundle length information, may correspond to Nd. The bundle length information may convey directly the Nd. However, the bundle length information may convey a function of the determined number of transmissions Nd. For instance, the bundle length information may indicate how many subframes until the maximum (N) were not required for successful decoding. This corresponds to an offset to the maximum which may be advantageous for a finer granularity around the maximum, and which is therefore also independent of the value of N itself and is therefore particularly advantageous if the bundle length may change frequently, such as from bundle to bundle. As an example, the following feedback information could be used in this embodiment:

| Nd: Number of received repetitions for successful decoding of the data portion | Bundle length information |
|---|---|
| 1 to N − 16 | 16 (equivalent to N − 16) |
| N − 15 to N − 5 | 5 (equivalent to N − 10) |
| N − 4 to N | 0 (equivalent to N) |

The three values of the bundle length information may be then coded by respective three different (e.g. orthogonal) spreading codes.

Moreover, the negative acknowledgement may also be spread by different spreading codes indicating how many more retransmissions would be required, i.e. how long the next bundle for the same data portion should be. This may be helpful for the data transmitting device, such as eNodeB for scheduling retransmissions. For instance, the terminal may determine the number Nd of overall transmissions of the same data portion after transmission of more than one transmission bundles for one or more previously received data portion(s). However, the present invention is not limited thereto and the number Nd of all transmissions (counted over all transmission bundles for the same data portions) may be estimated on the basis of a reliability metric calculated by a soft-decoder when attempting to decode the data portion. For example, the reliability of the most likely (most reliable) and the second most likely (second most reliable)

codeword may be compared and Nd may be determined accordingly, e.g. proportionally to the difference.

The operation of spreading the feedback information can also be performed in the I/Q domain, i.e. it can be seen as a modification of the signal in the complex signal plane. The increasing of the minimum distance between the negative acknowledgement and any positive acknowledgement (i.e. the positive acknowledgement spread by any of the spreading sequences used to indicate the bundle length information) can be achieved, by designing the signal and sequence in the complex signal plane accordingly. For example, if before spreading an ACK is represented by +1 and a NACK is represented by −1, the spreading can be designed to affect the ACK/NACK signal similar to e.g. PSK or QAM modulation alphabets, where potentially only a subset of constellation points is utilized to represent the plurality of ACK and the NACK feedback signal.

Figure 6:
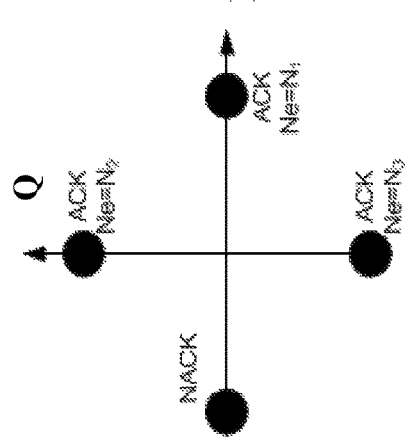
FIG. 6 is a schematic drawing illustrating an exemplary QPSK constellation in a complex plane used to jointly signal reception acknowledgement and bundle length information.

For example, a simple QPSK alphabet shown in FIG. 6 can be expressed by the following modulation points:

$$p_i = \exp\left(j2\pi\frac{i}{4}\right) \; i \in \{0, 1, 2, 3\}$$

Figure 7B:
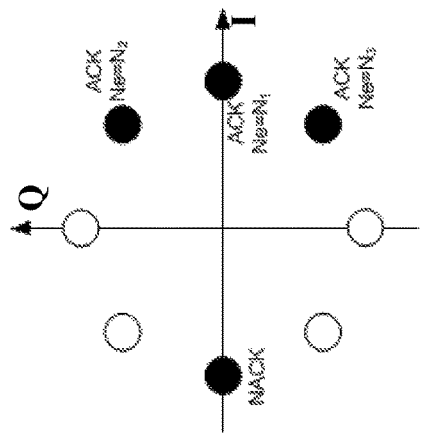
FIGS. 7A and 7B is a schematic drawing illustrating two exemplary 8-PSK constellations in a complex plane used to jointly signal reception acknowledgement and bundle length information.
Figure 7A:
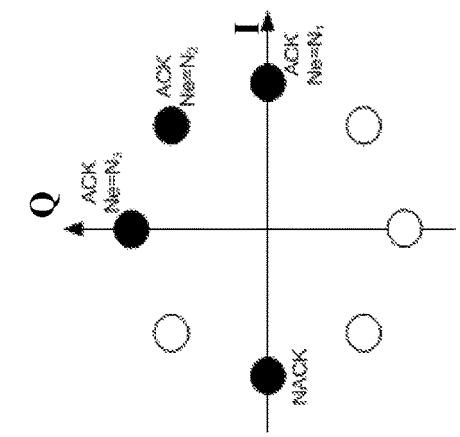

If the signal for NACK after I/Q spreading is $P_{NACK}=\exp(j\pi)$, and the ACK feedback should carry three different values $N_1$, $N_2$, $N_3$ for Ne, the following constellation point mapping (and the corresponding spreading code definition c) can be exemplarily employed, shown in FIG. 7A:

$$p_{ACK,Ne=N_1} = \exp(j0) \quad c_{ACK,Ne=N_1} = 1$$
$$p_{ACK,Ne=N_2} = \exp\left(j\frac{\pi}{2}\right) \quad c_{ACK,Ne=N_2} = \exp\left(j\frac{\pi}{2}\right)$$
$$p_{ACK,Ne=N_3} = \exp\left(-j\frac{\pi}{2}\right) \quad c_{ACK,Ne=N_3} = \exp\left(-j\frac{\pi}{2}\right)$$
$$N_1 < N_2 < N_3 = N \quad c_{NACK} = 1$$

With such a mapping, the following squared Euclidean distances can be obtained:

|  | Signal 1 | | | |
| --- | --- | --- | --- | --- |
| Signal 2 | $p_{NACK}$ | $p_{ACK,Ne=N_1}$ | $p_{ACK,Ne=N_2}$ | $p_{ACK,Ne=N_3}$ |
| $p_{NACK}$ | 0 | 4 | 2 | 2 |
| $p_{ACK,Ne=N_1}$ | 4 | 0 | 2 | 2 |
| $p_{ACK,Ne=N_2}$ | 2 | 2 | 0 | 4 |
| $p_{ACK,Ne=N_3}$ | 2 | 2 | 4 | 0 |

It may be noted that this design exploits already all the available 4 spreading sequences.

For example, a simple 8-PSK alphabet can be expressed by the following modulation points:

$$p_i = \exp\left(j2\pi\frac{i}{8}\right) \; i \in \{0, 1, 2, 3, 4, 5, 6, 7\}$$

For example, if the signal for NACK after I/Q spreading is $P_{NACK}=\exp(j\pi)$, and the ACK feedback should carry three different values $N_1$, $N_2$, $N_3$ for Ne, the following constellation point mapping (and the corresponding spreading code definition c) can be exemplarily employed:

$$p_{ACK,Ne=N_1} = \exp(j0) \quad c_{ACK,Ne=N_1} = 1$$
$$p_{ACK,Ne=N_2} = \exp\left(j\frac{\pi}{4}\right) \quad c_{ACK,Ne=N_2} = \exp\left(j\frac{\pi}{4}\right)$$
$$p_{ACK,Ne=N_3} = \exp\left(j\frac{\pi}{2}\right) \quad c_{ACK,Ne=N_3} = \exp\left(j\frac{\pi}{2}\right)$$
$$N_1 < N_2 < N_3 = N \quad c_{NACK} = 1$$

With such a mapping, the following squared Euclidean distances can be obtained:

|  | Signal 1 | | | |
| --- | --- | --- | --- | --- |
| Signal 2 | $p_{NACK}$ | $p_{ACK,Ne=N_1}$ | $p_{ACK,Ne=N_2}$ | $p_{ACK,Ne=N_3}$ |
| $p_{NACK}$ | 0 | 4 | ≈3.41 | 2 |
| $p_{ACK,Ne=N_1}$ | 4 | 0 | ≈0.59 | 2 |
| $p_{ACK,Ne=N_2}$ | ≈3.41 | ≈0.59 | 0 | ≈0.59 |
| $p_{ACK,Ne=N_3}$ | 2 | 2 | ≈0.59 | 0 |

In both the QPSK and the 8-PSK example, when assuming that the Noise is additive white Gaussian Noise, the error probability increases with decreasing squared Euclidean distance. In the QPSK example, it can be seen that the least likely error cases are NACK-ACK(Ne=$N_1$) and ACK (Ne=$N_3$)-ACK(Ne=$N_2$), followed by NACK-ACK(Ne=$N_3$), NACK-ACK(Ne=$N_2$), ACK(Ne=$N_1$)-ACK(Ne=$N_2$) and ACK(Ne=$N_1$)-ACK(Ne=$N_2$). Since $N_1<N_2<N_3=N$, this implies that an error between NACK and the smallest Ne value is least likely, and an error between NACK and the largest Ne is more likely.

For the 8-PSK example, it can be seen that the least likely error case is NACK-ACK(Ne=$N_1$), followed by NACK-ACK(Ne=$N_2$), followed by NACK-ACK(Ne=$N_3$), followed by the most likely error cases ACK(Ne=$N_1$)-ACK(Ne=$N_2$) and ACK(Ne=$N_3$)-ACK(Ne=$N_2$). Since $N_1<N_2<N_3=N$, this means that an error between NACK and the smallest Ne value is least likely, and an error between ACK with the largest Ne and the medium Ne is most likely, as is an error between ACK with the smallest Ne and the medium Ne. As described previously, these are the most preferable error properties for the system, as an error between ACK of different Ne values is less harmful to the communication system than between NACK and any ACK; accordingly, the corresponding squared Euclidean distance between NACK and any ACK should be preferably larger than between any ACK constellation points.

Using a PSK alphabet or constellation as the basis for the signal and spreading code design has some benefit in that each feedback signal is transmitted with the same power. If for example a QAM alphabet or constellation serves as the basis for the signal and spreading code, the design should further use constellation points that result in an equal transmission power. This could be easily achieved by using a constellation point for NACK with the largest possible transmit power, and using constellation points for the various reception acknowledgement and bundle information signals that reside in the antipodal quadrant of the NACK signal with the exception of the signal point with the largest transmit power. For example in a 16-QAM alphabet, each constellation point can be expressed by $$p_{i,k} = \frac{i + j \cdot k}{\sqrt{10}}, i, k \in \{-3, -1, +1, +3\}.$$

Figure 8B:
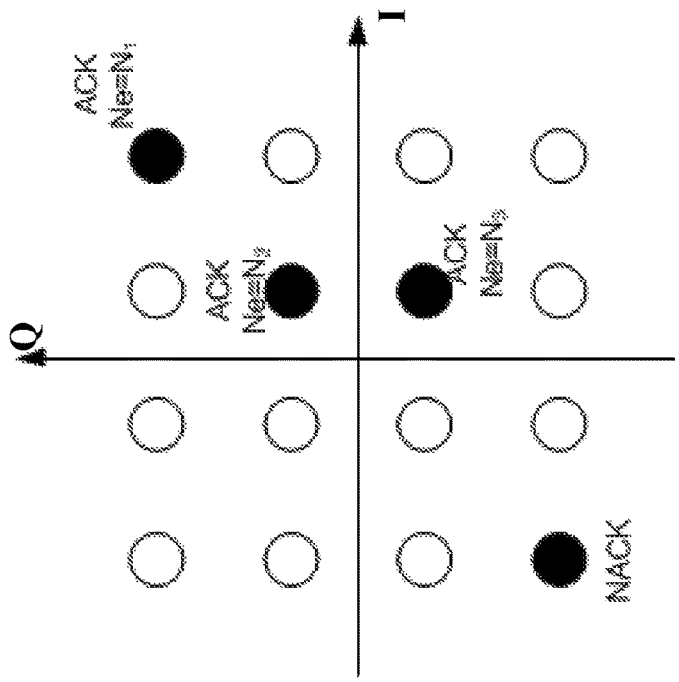
FIGS. 8A and 8B is a schematic drawing illustrating two exemplary 16-QAM constellations in a complex plane used to jointly signal reception acknowledgement and bundle length information.
Figure 8A:
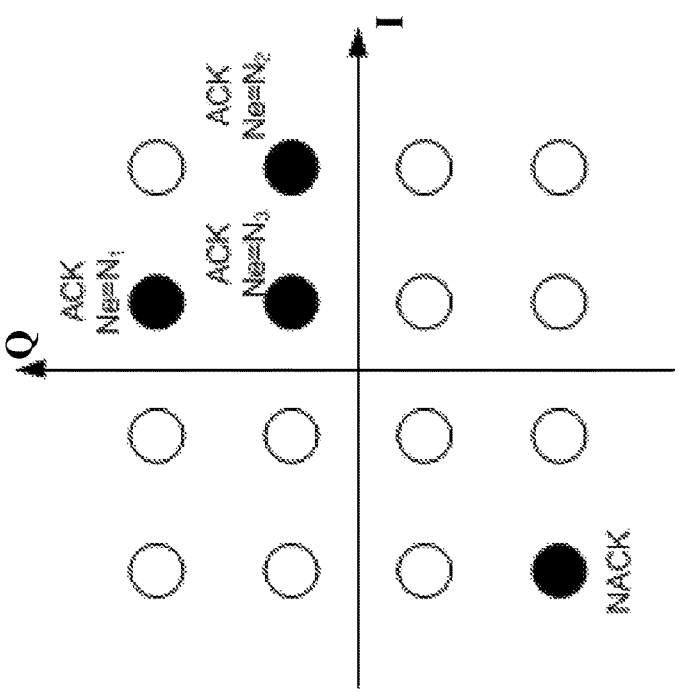

Then one possibility for fulfilling the described condition is shown in FIG. 8A and given by:

$$p_{NACK} = \frac{-3-3j}{\sqrt{10}} \quad c_{NACK} = \frac{+3+3j}{\sqrt{10}}$$
$$p_{ACK,Ne=N_1} = \frac{+1+3j}{\sqrt{10}} \quad c_{ACK,Ne=N_1} = \frac{+1+3j}{\sqrt{10}}$$
$$p_{ACK,Ne=N_2} = \frac{+3+j}{\sqrt{10}}, \quad c_{ACK,Ne=N_2} = \frac{+3+j}{\sqrt{10}}$$
$$p_{ACK,Ne=N_3} = \frac{+1+j}{\sqrt{10}} \quad c_{ACK,Ne=N_3} = \frac{+1+j}{\sqrt{10}}$$
$$N_1 < N_2 < N_3 = N$$

It may be noted that the exemplary designs here for 8-PSK and 16-QAM employ only a subset of the available constellation points, that is they include already the aspect that the distances can be increased by such a subset approach as outlined previously, as obviously a 8-PSK constellation would support up to 8 different spreading codes and a 16-QAM would support up to 8 different spreading codes.

In case that more than 3 Ne values should be defined for the feedback signal, other constellation points can be added. The general aspect of the present disclosure is kept that the squared Euclidean distance between NACK and the ACK with the largest Ne value should be the smallest distance compared to NACK and any other Ne value; furthermore the squared Euclidean distance between NACK and the ACK with the smallest Ne value should be the largest distance between NACK and any other Ne value. Generally, the order of squared Euclidean distances $d^2$ between NACK and any ACK+Ne value should be the reverse order of Ne values; in other words, if $N_1 < N_2$ then $d^2(NACK-ACK,N_1) \geq d^2(NACK-ACK,N_2)$, where the equality may be necessary especially in cases like above for QPSK. This principle is equally applicable to higher order alphabets such as e.g. a 64-QAM alphabet or 16-PSK alphabet, or any less regular alphabet that can be represented by complex coordinates. Those skilled in the art will appreciate that a rotation by an angle φ for each of the employed points equivalent to a multiplication by exp(j*φ) can be done without changing the squared Euclidean distance properties; also that applying the design based on the squared Euclidean distances between constellation points is equivalent to basing them on the Euclidean distances (i.e. not squared) mutatis mutandis.

In FIG. 7B, an alternative example for using the 8-PSK modulation points for the feedback information signaling. Compared to the example shown in FIG. 7A, the overall NACK-ACK error probability is reduced because the smallest distance to any ACK point is larger than in FIG. 7A (i.e. in FIG. 7A the minimum NACK-ACK squared distance is 2, wherein in FIG. 7B the minimum NACK-ACK squared distance is ≈3.41). This comes however at the expense of having an increased error probability between Ne=$N_1$ and Ne=$N_3$, as the corresponding squared distance is reduced from 2 to ≈0.59.

In FIG. 8B, an alternative example for using the 16-QAM modulation points for the feedback information signaling, which notably uses the highest transmit power for the feedback of NACK as well as for ACK with Ne=$N_1$, but still keeping the average power of the four supported constellations point to 1. Compared to the example shown in FIG. 8A, the overall NACK-ACK error probability is slightly increased because the smallest distance from NACK to any ACK point is larger than in FIG. 8A (i.e. in FIG. 8A the minimum NACK-ACK squared distance is 3.2, wherein in FIG. 8B the minimum NACK-ACK squared distance is 2). This comes however at the benefit of having a reduced error probability between NACK and Ne=$N_1$, as the corresponding squared distance is increased from 5.2 to 7.2. Additionally, the error probability between Ne=$N_1$ and Ne=$N_3$ is reduced due to an increased squared Euclidean distance from 0.4 to 2. This latter aspect is beneficial since an error between Ne=$N_1$ and Ne=$N_3$ is more detrimental to the communication system than an error between Ne=$N_1$ and Ne=$N_2$ provided that $N_1 < N_2 < N_3$.

It should be further noted that particularly the 8-PSK and 16-QAM examples utilize a different spreading code for NACK and any ACK to further increase the corresponding distances. Generally this approach becomes advantageous, if the number of values that should be conveyed for reception acknowledgement and the bundle information is smaller than the number of available constellation points minus one. It is noted that the above constellations are only examples and the above described disclosure is also applicable to any other multi-level modulations such as M-QAM with M=64, 128, 256 or any other or M-PSK such as 16-PSK or 64-PSK or others. The present approach is also applicable to other modulation schemes including M-PAM and coset modulations or any other schemes.

The above example illustrates joint coding of the reception acknowledgement and the bundle information. However, the joint coding of the reception acknowledgement and the bundle length information may also be performed in another way. For instance, the respective combinations of ACK with the bundle length information may be assigned corresponding spreading sequences, whereas NACK is assigned one other spreading sequence or, different combinations of NACK and bundle length information may be assigned respective spreading sequences.

However, the present invention is not limited to any of the above described implementations of joint coding and the bundle length indication does not have to be a part of the reception acknowledgement feedback. It may be conveyed as a part of MAC control element. This way of signaling could achieve a better averaging already at the terminal side. On the other hand, the MAC signaling requires an extra uplink packet which may be more costly, especially in the coverage enhancement mode.

In the example described with reference to FIG. 4, the bundle length was determined by the spreading code. In case of Zadoff-Chu codes or any codes having similar correlation properties, instead of spreading codes the bundle length information may be signaled by selection of a particular cyclic shift within a subframe.

Figure 3B:
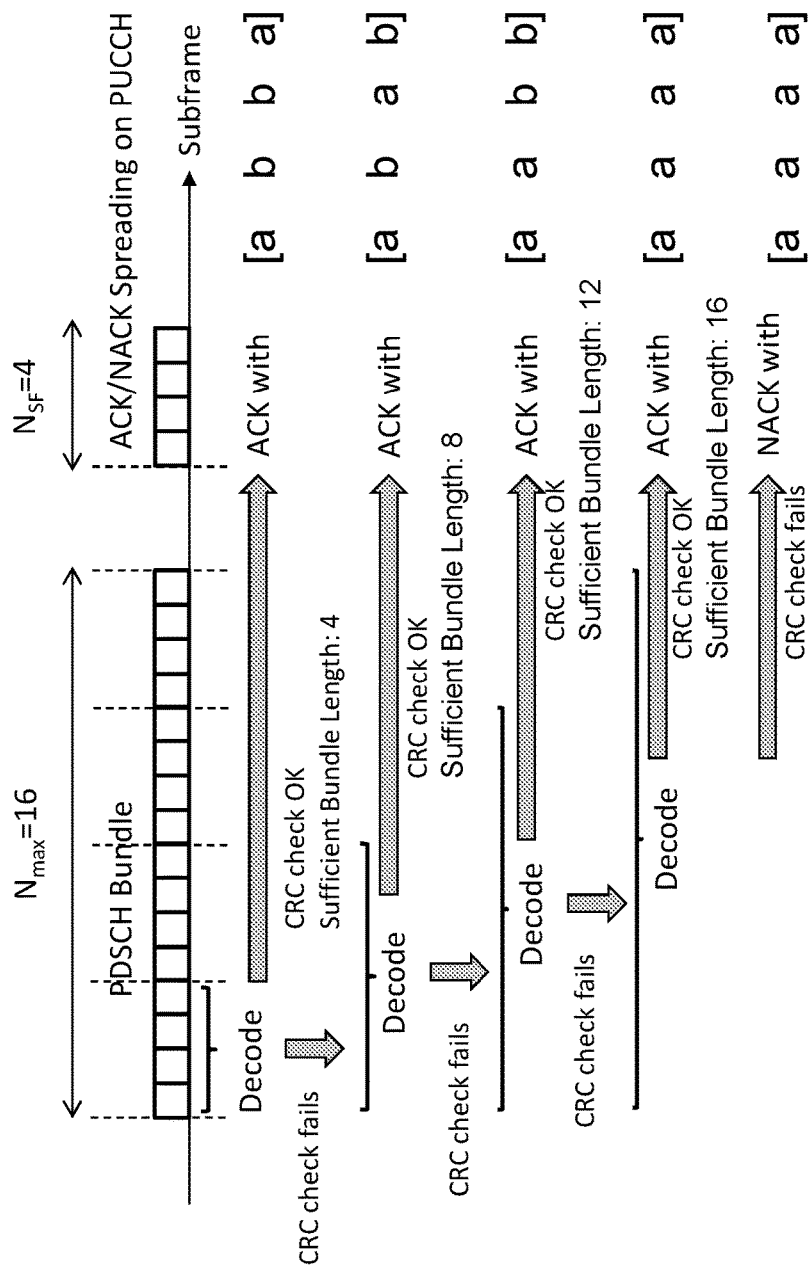
FIG. 3B is a schematic drawing illustrating transmission of data and feedback using repetitions and resource hopping for ACK/NACK spreading.

As already mentioned above, the coding of the reception acknowledgement and the bundle length information is not limited to directly spreading (by e.g. applying XOR with the binary spreading sequence to the reception acknowledgement). Rather, according to an embodiment, the spreading sequence determines the resources on which the reception acknowledgement (ACK/NACK) is transported. FIG. 3B illustrates this approach. FIG. 3B is similar to FIG. 3A. However, in FIG. 3B the spreading sequence is used to determine the location of the resources for ACK/NACK rather than to multiply the ACK/NACK signal.

In particular, in FIG. 3B, there are two resources a, b which can be used to convey the acknowledgement. However, only one of the resources per subframe is effectively used. For instance, if the decoding was successful after Nd=4 repetitions, the spreading sequence is [a b b a]. This means that the acknowledgement (negative or positive) is transmitted in four subframes: in the first subframe in the resource a, in the second subframe in the resource b, in the third subframe in the resource b and in the fourth subframe in the resource a. The resource "a" may be a particular resource block within the subframe, whereas the resource "b" is one other resource block within the same subframe. The subframes may be consecutive as illustrated in FIG. 3B.

However, it is noted that the present invention is not limited thereto and that, in general, the subframes are not necessarily consecutive. Moreover, the resource blocks is only one example of the resources a and b. In general, the resources may be represented by a cyclic shift (shift by a and shift by b bits, respectively) of a Zadoff-Chu sequence, or any sequence with the feature of being orthogonal to itself upon (at least certain) shifts. Alternatively, the resources may be slots of the frame or any other resource portions of a subframe.

Alternatively or in addition, resources a and b may be also defined by the subframe. For instance, there may be M subframes for effective transmitting the acknowledgement repetitions but 2*M consecutive subframes within which these M subframes are distributed. For instance, resources a and b are located in two consecutive subframes and this pattern is repeated 4 times. Accordingly, the spreading sequence [a b b a] would be transmitted in the first, fourth, sixth and seventh of eight consecutive subframes.

It is noted that the position of the resources does not have to be binary. Rather, there may be a possibility to select between a plurality of resource locations a, b, c, . . . etc. More resources may increase the distance between the particular resources and thus, decrease the probability collisions and therefore of erroneous decoding of the feedback information.

In FIG. 3B, the spreading code for the ACK and the bundle length information corresponding to Ne=N (successful decoding after the number of repetitions being equal to transmission bundle length) is equal to the spreading code for signaling NACK. This is beneficial, since an ACK after N repetitions is closer to the NACK as ACK with any other number of repetitions. Thus, if an error occur, its negative consequences are not as detrimental to the communication system; as indicated previously, an error resulting in a fundamentally wrong value of the sufficient bundle length may have consequences on the later resource assignments, i.e. resulting in a far too large or far too small transmit bundle size determination at the data transmitting device.

In the above examples the repetition of the reception acknowledgement, i.e. the spreading of the ACK/NACK over time domain has been mainly described as spreading over multiple subframes such as subframes in the LTE. However, the present invention is not limited thereto and, in general, the spreading may also be performed over temporal domain resources with a granularity different from the LTE subframes. For instance, the spreading may also be performed over OFDM symbols of one subframe or over the two slots of the subframe. It is noted that combined solutions are possible and advantageous, such as spreading the ACK/NACK over selected OFDM-symbols of a plurality of subframes or slots. The OFDM symbols may also be grouped into symbol portions, each portion having a predefined number of OFDM symbols, and the spreading may be performed over the symbol portions.

Figure 4:
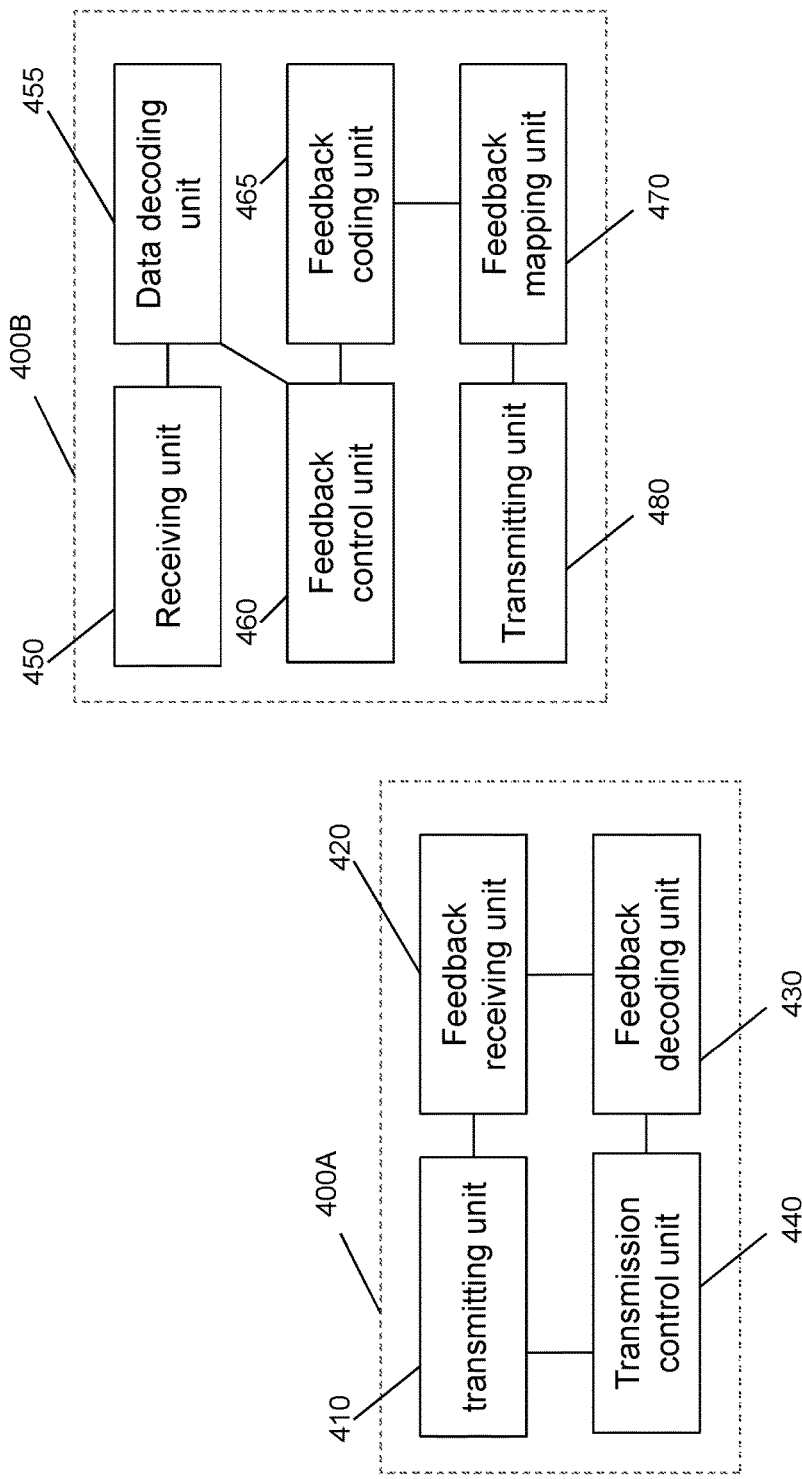
FIG. 4 is a block diagram illustrating the data receiving and the data transmitting apparatus.

FIG. 4 shows an example of a data receiving device 400B for receiving data in a wireless communications system. The wireless communication system may be LTE or any other wireless cellular system. However, it may also be any other communication system in which data is transmitted and received over a wireless interface, for instance any ad-hoc network or home network. The data receiving device 400B includes a receiving unit 450 for receiving up to a predetermined number N of transmissions of a data portion in a transmission bundle, coded in the respective predetermined number N of subframes; a feedback control unit 460 for judging whether or not the data portion was decoded successfully and for generating a positive or a negative reception acknowledgement in accordance with the result of the judging, and for determining a number of transmissions Ne after which the decoding of the data portion was successful; and a transmitting unit 480 configured to transmit the reception acknowledgement and to transmit a bundle length information corresponding to the determined number Ne of transmissions or a function of said determined number Ne of transmissions.

The receiving unit 450 may be further configured to receive from the data transmitting device configuration information concerning the number N of transmissions to be applied for future data portions to be transmitted. Upon reception of such configuration information, the data receiving device 400B may confirm the configuration by sending the back with the transmitting unit 480 a confirmation message to the data transmitting device 400A. Such an approach is advantageously applied if the configuration is performed over higher layer protocol such as RRC. The newly adopted configuration of N is then applied, i.e. the receiving unit 450, as well as a feedback control unit 460 are configured accordingly. In case of physical layer signaling such as DCI, no such explicit confirmation is necessary, and the receiving unit 450 would apply the new configuration of N upon reception of the same.

The feedback control unit 460 performs tasks concerning feedback information generation. For instance, it determines whether the data portion was decoded successfully and generates a feedback positively or negatively acknowledging the receipt. Moreover, it determines after how many repetitions of the data portion the decoding was successful. The feedback control unit then generates the corresponding sufficient bundle size information as described above. The positive or negative acknowledgement, as well as the sufficient bundle size, are then transmitted by the transmitting unit 480. The transmission of the acknowledgement and the bundle size may be performed within one message. However, it is also possible to transmit them separately, in particular, in one implementation, the acknowledgement is transmitted (and, possibly, also determined) more frequently than the indication of the bundle size sufficient for successful decoding and using a different transmission mechanism; for example, the transmission of the acknowledgement may be done using a physical uplink control channel, while the indication of the bundle size may be done by means of a MAC control element that is ultimately transmitted using a physical uplink shared channel.

The data receiving device 400B may further include a feedback coding unit 465 for encoding the reception acknowledgement and the bundle length information. In particular, the reception acknowledgement and the bundle length information may be coded jointly. However, the feedback coding unit 465 may alternatively encode the bundle length information and the acknowledgement separately and/or in a different manner, especially in case both are transmitted separately as outlined above.

The data receiving device 400B can also include a feedback mapping unit 470 for mapping the feedback information onto wireless system resources by spreading it to a plurality M of subframes located at least a predetermined number k of subframes after the last subframe of the predetermined number N of transmissions of the data portion. However, it is noted that the present invention is not limited to apply repetitions for the transmission of the feedback information. Nevertheless, the time domain redundancy provides the advantage of increasing the probability of correct detection and decoding of the feedback at the data transmitting device side. The feedback mapping unit 470 is advantageously configured to spread the feedback information over the M subframes in accordance with a spreading rule of a predetermined number d of rules, the spreading rule being determined in accordance with the bundle length. The spreading rule may be a spreading code out of a set of d spreading codes. Beneficially, the d spreading codes are orthogonal with respect to each other. However, the present invention is not limited to employ the spreading to feedback. The spreading may be understood as coding of the feedback information with a codeword corresponding to the respective spreading sequence. Advantageously, the number d of the spreading rules is smaller than the number N of transmissions. Accordingly, not all values of the sufficient bundle length can be signaled. Therefore, the granularity of the bundle length information is coarser. However, the redundancy caused by the repetition is reduced.

The spreading sequences may belong to one of Walsh-Hadamard code, DFT-based complex spreading code or Zadoff-Chu code or different cyclic shifts of a pseudo-random sequence.

The bundle length information does not necessarily convey the sufficient bundle length directly in the form of the number of transmissions after which decoding was successful or a function thereof. In accordance with an implementation, the difference between N and the determining number of transmissions Ne after which the decoding of the data portion was successful, which means the number of transmissions of a bundle which were not necessary to successful decode a data portion.

FIG. 4 also shows the data transmitting device 400A for transmitting data in the wireless communications system, the device comprising: a transmitting unit 410 for transmitting a predetermined number N of transmissions of a data portion, coded in the respective predetermined number N of subframes; a feedback receiving unit 420 for receiving a reception acknowledgement and for receiving a bundle length information from a data receiving apparatus, the bundle length information corresponding to a number of transmissions or a function of said number of transmissions after which the decoding of the data portion at the receiving apparatus was successful; and a transmission control unit 440 for setting the predetermined number N in accordance with the received bundle length information.

The data transmitting device 400A further includes a feedback decoding unit 430 for decoding the feedback received. As described above, the feedback information may be coded for instance by means of applying a spreading code to the acknowledgement in accordance with the value of the bundle length. In accordance with the feedback received and in particular in accordance with the bundle length information, a repetition control unit 440 evaluates, whether or not it is necessary to change the number of repetitions N, meaning that the number of repetitions can be lowered or increased in accordance with a feedback. The repetition control unit 440 decides whether a new value of N is necessary and, if so, instructs the transmitting unit 410 to apply the new value. In addition, the transmitting unit 410 may be configured to transmit the newly set value to the data receiving device and to apply the new value, possibly after receiving the confirmation from the data receiving device.

It is noted that apart from the possibility of configuring the transmission bundle length, the type of bundle length information reporting may be configured by the data transmitting device and signaled to the data receiving device. For instance, the number M of repetitions applied for transmitting the feedback may be signaled. Moreover, the value(s) q or resolution r of the bundle length information Ne signaling may be configured and conveyed. Alternatively, the configuration may include the particular amounts of repetitions after which the decoding is attempted at the data receiving device. Alternatively or in addition, the type and/or length and/or amount of spreading codes may be signaled. In general, they may be predefined profiles including pre-set configurations of the bundle length information reporting, which may be selected by the data transmitting device and signaled to the data receiving device.

The repetition control unit 440 may perform the decision on whether or not to change the value of N either regularly with a predetermined frequency or in an event-driven manner. In particular, the repetition control unit 440 may decide, based on comparison of a function of the recently received bundle lengths Ne with the currently applied, whether a change of N is necessary. A change of N may be considered as necessary, if the difference between the function and the current N exceeds a predetermined threshold.

In accordance with another embodiment of the present invention a system is provided which includes the data transmitting device 400A and the data receiving device 400B as described above communicating with each other over a wireless interface.

It is noted that the data transmitting apparatus may be a base station and the data receiving apparatus may be a user equipment, wherein the above mentioned units are embodied by a specialized chip or a digital signal processor or a mixture of correspondingly configured/programmed hardware. For instance, the receiving and the transmitting units may include the antennas, the respective A/D and D/A converters, demodulators and a baseband digital signal processing hardware such as a digital signal processor or a general purpose processor or FPGA or an ASIC or the like, which then performs the reception/transmission on the bit level. The feedback control unit may be embodied on the same piece of hardware as the base band digital signal processing and coding/decoding or in a different piece of hardware.

Figure 5:
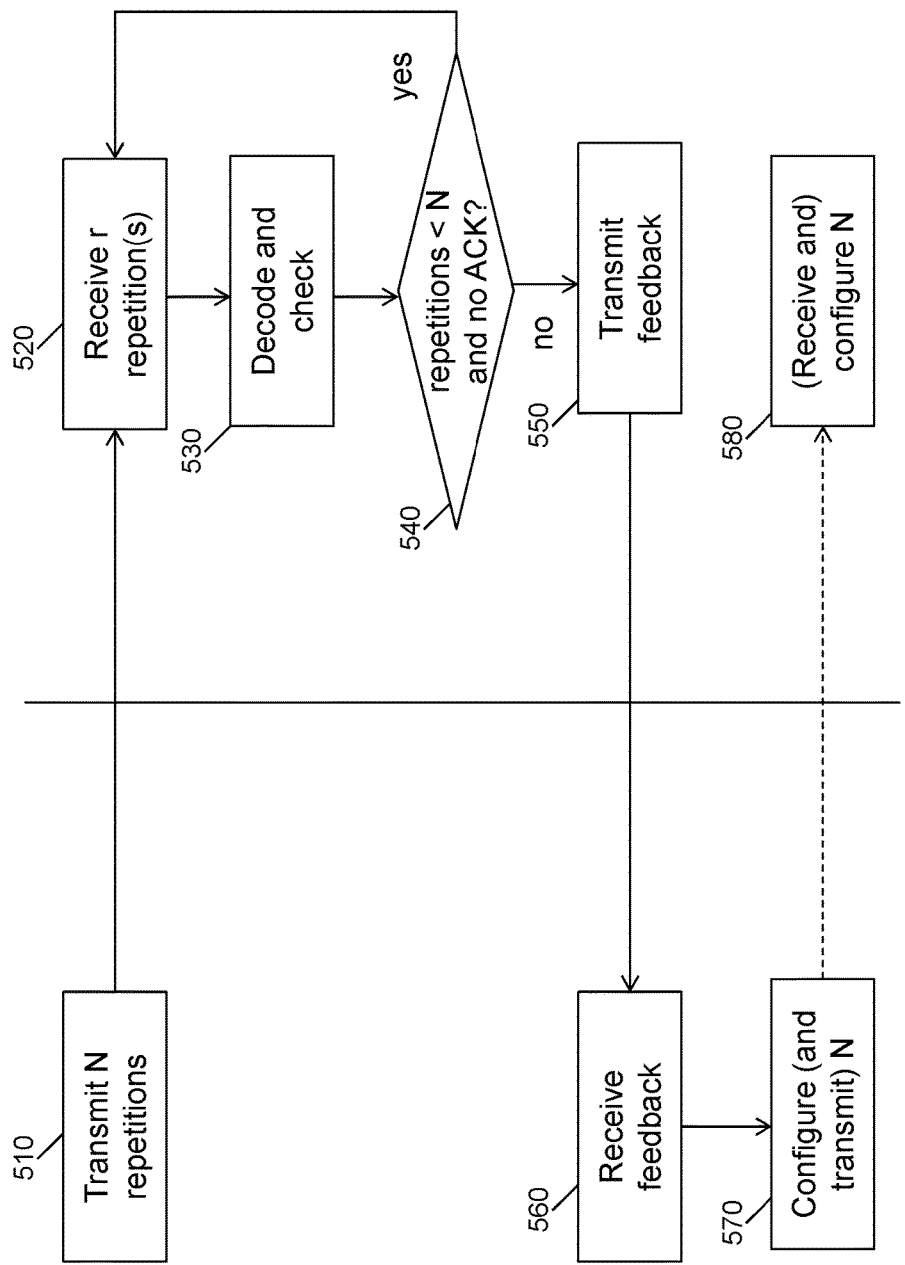
FIG. 5 is a flow diagram illustrating the data receiving and data transmitting method.

FIG. 5 is a flow diagram illustrating methods for transmitting and receiving data respectively in a wireless communication system as described above.

In particular, a method is provided for receiving data in a wireless communications system, the method comprising the steps of receiving 520 up to a predetermined number N of transmissions of a data portion in a transmission bundle, coded in the respective predetermined number N of subframes; determining 530 whether or not the data portion was decoded successfully and for generating a positive or a negative reception acknowledgement in accordance with the result of the determining, and for determining 530, 540 a number of transmissions Ne after which the decoding of the data portion was successful; and transmitting 550 the reception acknowledgement and transmitting 550 a bundle length information corresponding to the determined number Ne of transmissions or a function of said determined number Ne of transmissions. It is noted that the step of receiving 520 may include a receiving of all N repetitions. However, in order to save power, the reception may be performed only until the decoding of the data portion is successful. As soon as the decoding is successful, no further repetitions are necessary. If the decoding is not successful and not all N repetitions are received and processed, a subsequent execution of step 520 may assume a different value of r from previous executions of step 520.

Moreover, a method is provided for transmitting data in a wireless communications system, the method comprising the steps of transmitting 510 a predetermined number N of transmissions of a data portion in a bundle, coded in the respective predetermined number N of subframes; receiving 560 a reception acknowledgement and for receiving a bundle length information from a data receiving apparatus, the bundle length information corresponding to a number of transmissions or a function of said number of transmissions after which the decoding of the data portion at the receiving apparatus was successful; setting 570 the predetermined number N in accordance with the received bundle length information. Moreover, the configuration step may be further followed by transmitting the newly configured N to the data receiving device. At the data receiving device, a step of receiving 580 and configuring N may further be performed.

The steps of the above described methods may also be performed by a processor or a processing unit including a plurality of interconnected hardware pieces such as processor(s), ASIC(s), FPGA(s) etc.

The explanations given in the Technical Background section above are intended to better understand the specific exemplary embodiments described herein and should not be understood as limiting the invention to the described specific implementations of processes and functions in the mobile communication network such as a network compliant with the 3GPP standards. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Summarizing, the present invention relates to transmission and reception of data in a wireless communication system. In particular, the predetermined number of repetitions of the same data portion is transmitted over the wireless interface. The receiving device receives the repetitions, attempts their decoding and checks whether the decoding was successful. If the decoding was successful after the predetermined number of repetitions or less, a positive acknowledgement is generated. In addition, a feedback including a bundle size information is generated and transmitted. The bundle size information includes a number of repetitions, smaller or equal to the predetermined number, after which the decoding was successful. The feedback is transmitted to the data transmitting device which may adapt the predetermined number of repetitions accordingly. The invention enables efficient control of the number of repetitions applied which is particularly advantageous for coverage enhancement purposes.

The invention claimed is:

1. An apparatus for receiving data in a wireless communications system, the apparatus comprising:
a receiver which, in operation, receives up to a predetermined number N of repeated transmissions of the same data portion, coded in the respective predetermined number N of subframes, N being greater than 1;
circuitry which, in operation, judges whether or not the data portion has been decoded successfully, generates a positive or a negative reception acknowledgement in accordance with a result of the judging, and determines, after the data portion has been decoded successfully, a number Ne of transmissions that are received prior to the data portion being decoded successfully; and
a transmitter which, in operation, transmits the reception acknowledgement, and transmits bundle length information corresponding to the determined number Ne of transmissions or a function of the determined number Ne of transmissions.

2. The apparatus according to claim 1, wherein
the circuitry, in operation, generates feedback information by jointly coding the reception acknowledgement and the bundle length information, and
the transmitter, in operation, transmits the feedback information.

3. The apparatus according to claim 2, wherein the circuitry, in operation, maps the feedback information onto wireless system resources by spreading it to a plurality M of subframes located at least a predetermined number K of subframes after the last subframe of the predetermined number N of repeated transmissions of the same data portion.

4. The apparatus according to claim 3, wherein the circuitry, in operation, spreads the feedback information over the M subframes in accordance with a spreading rule of a predetermined number d of rules, the spreading rule being determined in accordance with the bundle length information.

5. The apparatus according to claim 4, wherein the number d is smaller than the predetermined number N.

6. The apparatus according to claim 5, wherein the feedback information is coded by a code including S codewords, among which:
S−1 codewords indicate a positive reception acknowledgement and the S−1 respective values for coding the bundle length information;
a codeword indicating a negative acknowledgement has a Hamming or Euclidean distance to any of the S−1 codewords indicating positive acknowledgement larger than the Hamming or Euclidean distance among the S−1 codewords indicating positive acknowledgement, S being smaller or equal to d.

7. The apparatus according to claim 6, wherein the S codewords belong to one of Walsh-Hadamard code, DFT-based complex spreading code or Zadoff-Chu code or different cyclic shifts of a pseudo-random sequence.

8. The apparatus according to claim 6, wherein the feedback information is coded by a code including one or more codewords for coding the negative acknowledgement and a number of further transmissions in addition to N.

9. The apparatus according to claim 4, wherein
the spreading rule is an index c designating one of S orthogonal spreading codes,
the code with index c is used to spread the reception acknowledgement and is selected according to the number Ne of transmissions as follows:

$$c = \left\lfloor \frac{N_e \cdot S}{N} \right\rfloor$$

or $$c = (N_e \bmod S).$$

10. The apparatus according to claim 3, wherein
said predetermined number N of subframes are consecutive subframes in a time domain of said wireless communications system, or
said plurality M of subframes are consecutive subframes in the time domain of said wireless communications system.

11. The apparatus according to claim 2, wherein the bundle length information indicates a difference between the predetermined number N and the number Ne of transmissions.

12. The apparatus according to claim 1 wherein the transmitter, in operation, transmits the bundle length information after the receiver receives all of the predetermined number N of repeated transmissions of the same data portion.

13. The apparatus according to claim 1, wherein the transmitter, in operation, transmits the bundle length information within an information element of a medium access control (MAC) protocol.

14. An apparatus for transmitting data in a wireless communications system, the apparatus comprising:
a transmitter which, in operation, transmits up to a predetermined number N of repeated transmissions of the same data portion, coded in the respective predetermined number N of subframes, to a data receiving apparatus, N being greater than 1;
a receiver which, in operation, receives a reception acknowledgement and receives bundle length information from the data receiving apparatus, the reception acknowledgement indicating whether or not the data portion has been decoded successfully by the data receiving apparatus, the bundle length information corresponding to a number of transmissions that are received by the data receiving apparatus prior to the data portion being decoded successfully, or a function of the number of transmissions; and
circuitry which, in operation, sets the predetermined number N in accordance with the received bundle length information.

15. A method for receiving data in a wireless communications system, the method comprising:
receiving up to a predetermined number N of repeated transmissions of the same data portion, coded in the respective predetermined number N of subframes, N being greater than 1;
judging whether or not the data portion has been decoded successfully;
generating a positive or a negative reception acknowledgement in accordance with a result of the judging;
determining, after the data portion has been decoded successfully, a number Ne of transmissions that are received prior to the data portion being successfully decoded;
transmitting the reception acknowledgement; and
transmitting bundle length information corresponding to the determined number Ne of transmissions or a function of the determined number Ne of transmissions.

16. A method for transmitting data in a wireless communications system, the method comprising:
transmitting up to a predetermined number N of repeated transmissions of the same data portion, coded in the respective predetermined number N of subframes, to a data receiving apparatus, N being greater than 1;
receiving a reception acknowledgement from the data receiving apparatus, the reception acknowledgement indicating whether or not the data portion has been decoded successfully by the data receiving apparatus;
receiving bundle length information from the data receiving apparatus, the bundle length information corresponding to a number of transmissions that are received by the data receiving apparatus prior to the data portion being successfully decoded, or a function of the number of transmissions; and
setting the predetermined number N in accordance with the received bundle length information.

* * * * *